United States Patent
Ghosh et al.

(10) Patent No.: US 8,572,735 B2
(45) Date of Patent: Oct. 29, 2013

(54) ATTACK RESISTANT CONTINUOUS NETWORK SERVICE TRUSTWORTHINESS CONTROLLER

(75) Inventors: Anup K. Ghosh, Centreville, VA (US); Yih Huang, Fairfax, VA (US); Arun Sood, Clifton, VA (US)

(73) Assignee: George Mason Research Foundation, Inc., Fairfax, VA (US)

( * ) Notice: Subject to any disclaimer, the term of this patent is extended or adjusted under 35 U.S.C. 154(b) by 1169 days.

(21) Appl. No.: 12/059,454

(22) Filed: Mar. 31, 2008

(65) Prior Publication Data

US 2009/0044265 A1  Feb. 12, 2009

Related U.S. Application Data

(60) Provisional application No. 60/908,857, filed on Mar. 29, 2007.

(51) Int. Cl.
 *G06F 11/00* (2006.01)
 *G06F 12/16* (2006.01)
 *G08B 23/00* (2006.01)

(52) U.S. Cl.
 USPC ............ 726/23; 726/22; 726/24; 726/25; 726/14; 709/224

(58) Field of Classification Search
 None
 See application file for complete search history.

(56) References Cited

U.S. PATENT DOCUMENTS

| | | | |
|---|---|---|---|
| 7,693,991 B2* | 4/2010 | Greenlee et al. | 709/226 |
| 2004/0008652 A1* | 1/2004 | Tanzella et al. | 370/338 |
| 2004/0064735 A1* | 4/2004 | Frazier et al. | 713/201 |
| 2005/0160133 A1* | 7/2005 | Greenlee et al. | 709/200 |
| 2006/0168156 A1* | 7/2006 | Bae et al. | 709/220 |
| 2006/0271661 A1* | 11/2006 | Qi et al. | 709/223 |
| 2007/0044151 A1* | 2/2007 | Whitmore | 726/23 |

* cited by examiner

*Primary Examiner* — Nathan Flynn
*Assistant Examiner* — Trang Doan

(57) ABSTRACT

An attack resistant continuous network service trustworthiness controller comprising: state estimation module(s), response selection module(s), actuation module(s), and client dispatcher communication module(s) for maintaining the availability and integrity of online server(s). The state estimation module(s) are configured to generate state estimate(s) for online server(s) using behavior data obtained using sensor module(s). The response selection module(s) are configured to determine corrective action(s) to maintain the availability and integrity of online server(s) when state estimate(s) indicate that the integrity of an online server(s) is compromised. The actuation module(s) are configured to activate actuator(s) based upon the corrective action(s). Client dispatcher communication module(s) are configured to communicate online server availability information to a client dispatcher.

19 Claims, 18 Drawing Sheets

Baseline Throughputs and Recovery Behavior

ATTACK RESISTANT CONTINUOUS NETWORK SERVICE TRUSTWORTHINESS CONTROLLER

CROSS-REFERENCE TO RELATED APPLICATIONS

This application claims the benefit of U.S. Provisional Application No. 60/908,857, filed Mar. 29, 2007, entitled "A Trustworthy Controller for Network Server Applications," which is hereby incorporated by reference in its entirety.

STATEMENT REGARDING FEDERALLY SPONSORED RESEARCH OR DEVELOPMENT

This invention was made with government support under SPAWAR Systems Center San Diego Contract No. N66001-06-C-2050 awarded by the Defense Advanced Research Projects Agency (DARPA). The government has certain rights in the invention.

BACKGROUND

Large, complex software systems are used to provide a variety of network services including web, mail, naming, authentication, routing, file transfer, and collaboration services. However, the complexity of these software systems makes perfect construction unrealizable. As a result, when latent software bugs are triggered or exploited by an attacker to gain unauthorized privilege or to deny service, then critical network services may go down. The impact of downtime from network services far exceeds that of a single workstation going down. An entire enterprise may go "off the net" if its DNS server is corrupted. Similarly, if its web server goes down, its corporate web presence may disappear. Finally, the impact on users from an unavailable mail server goes beyond frustration. It also means loss of productivity and potentially loss of business. Likewise, compromised servers can serve as an unwitting repository for malicious software, rootkits, and illicit digital content. In addition, compromised servers may often serve as active high-bandwidth spam host, participate in denial of service attacks, or simply as an on-demand zombie in a botnet.

While intrusion detection and prevention technologies have become mainstream commercial products, a stubborn problem persists: the inevitability of errors. Those errors may be called false positives when innocuous requests or system behaviors are misinterpreted as hostile or false negatives when successful intrusions evade detection. The former may waste considerable man power in the investigation of nonexistent breaches and cause service interruptions. The latter may be even more dangerous—undetected, compromised servers may be used as a jump pad to penetrate internal corporate networks or for other nefarious activity.

Much of today's software is inherently vulnerable to attack and unreliable for critical applications. The inherent problem stems from the complexity of software that introduces in some best case scenarios a bug density of 6 bugs per thousand lines of code (KLOC), average cases 10-12 bugs/KLOC. Some of the bugs lead to unreliability when triggered; others can lead to privilege escalation for unauthorized users when exploited. Furthermore, the manufacture lifecycle of software leaves open the possibility of insider sabotage wherein the code released from the software vendor contains embedded Trojans or backdoors to be used later for nefarious purposes.

Current solutions to this problem seek to add additional pressure on system manufacturers, such as major software vendors to release defect-free software. Most related work has focused on defect or intrusion prevention, detection, and removal. Almost all software-based approaches, though, are subject to being compromised by attacks against the machine.

A significant body of work exists to protect servers against attack, to recover after attack, and also to make servers fault tolerant. Here, we summarize the most current and related work to our approach.

The first line of defense against software flaws and attacks is to build better software by finding and eliminating flaws. These techniques can be useful in reducing exposure of software to attacks and increasing their reliability and should be used prior to deployment. However, they cannot be used to guarantee future behavior of the code. Another tactic is to filter input that a program receives to prevent attacks from exploiting vulnerabilities in code [4]. While effective at stopping many known attacks, filters are unable to stop attacks of unknown type, or attacks that resemble legitimate program input.

In contrast with preventative techniques discussed above, post-release techniques have been developed to account and compensate for successful attacks. Recent work in program instrumentation has enabled programs to detect and recover from faults and attacks [5], [6], [7], [8]. These approaches offer the ability to catch program faults while they occur, then continue executing. In failure-oblivious computing [5], memory de-referencing errors are caught by compiler-inserted runtime checks. Unlike prior techniques, such as safe-C compilers that throw an exception or terminate on unsafe memory accesses [9], failure oblivious computing and other fault-masking approaches such as [6], effectively hide the effect of faults by simply returning manufactured, but incorrect results, from dangerous fault conditions. While these techniques may tolerate the effect of a fault, they may no longer guarantee the session semantics, since they have altered the program's state in response to a bad input. In other words the program may no longer operate correctly.

In a similar vein, error virtualization is a technique used to re-locate program control flow to a known safe state, a so-called rescue point, while invoking the program's native error handling upon program fault detection [8]. The benefit of this technique over failure-oblivious computing, is that the program's native error handling code is forcibly returned on an otherwise unhandled fault condition. This technique at least ensures that the program will remain in a consistent state, if not the correct state for the program input. This technique counts on the host program, to some degree, to build in sufficient error handling techniques or rescue points to handle the manufactured values or the function return codes for error virtualization. Where failure-oblivious computing creates significant overhead in dynamic memory checks, error virtualization is performance efficient, but requires significant testing to identify relevant fault states and rescue points in order to handle potentially dangerous error conditions.

In a different, but related technique, Rx periodically checkpoints program states, then monitors the program for faults [7]. If a fault is detected, then the program is rolled back to a prior checkpoint, and re-executed, but this time in a different environment. If the program failed for environmental reasons, then the re-execution of the program and input in a new environment may result in an acceptable execution. Otherwise, the re-execution may simply cause the program to fault again.

One requirement of these techniques described above is that they require intimate knowledge of the application being protected. In other words, they require source code and are ideally used by the developer of the code, rather than by the acquirer of the server system. The techniques typically change program context, which may result in some interruption in service as well as potentially incorrect states.

What is needed is an architecture and techniques that does not require source code access, nor intimate knowledge of the application code. Additionally, there is a need for a system that provides security against attacks that compromise the root or super user privilege on a machine by observing, adapting and acting to compensate for adverse conditions the server experiences to ensure continued trustworthy service of client requests in the face of software failures or attacks.

DETAILED DESCRIPTION OF EMBODIMENTS

Figure 1:
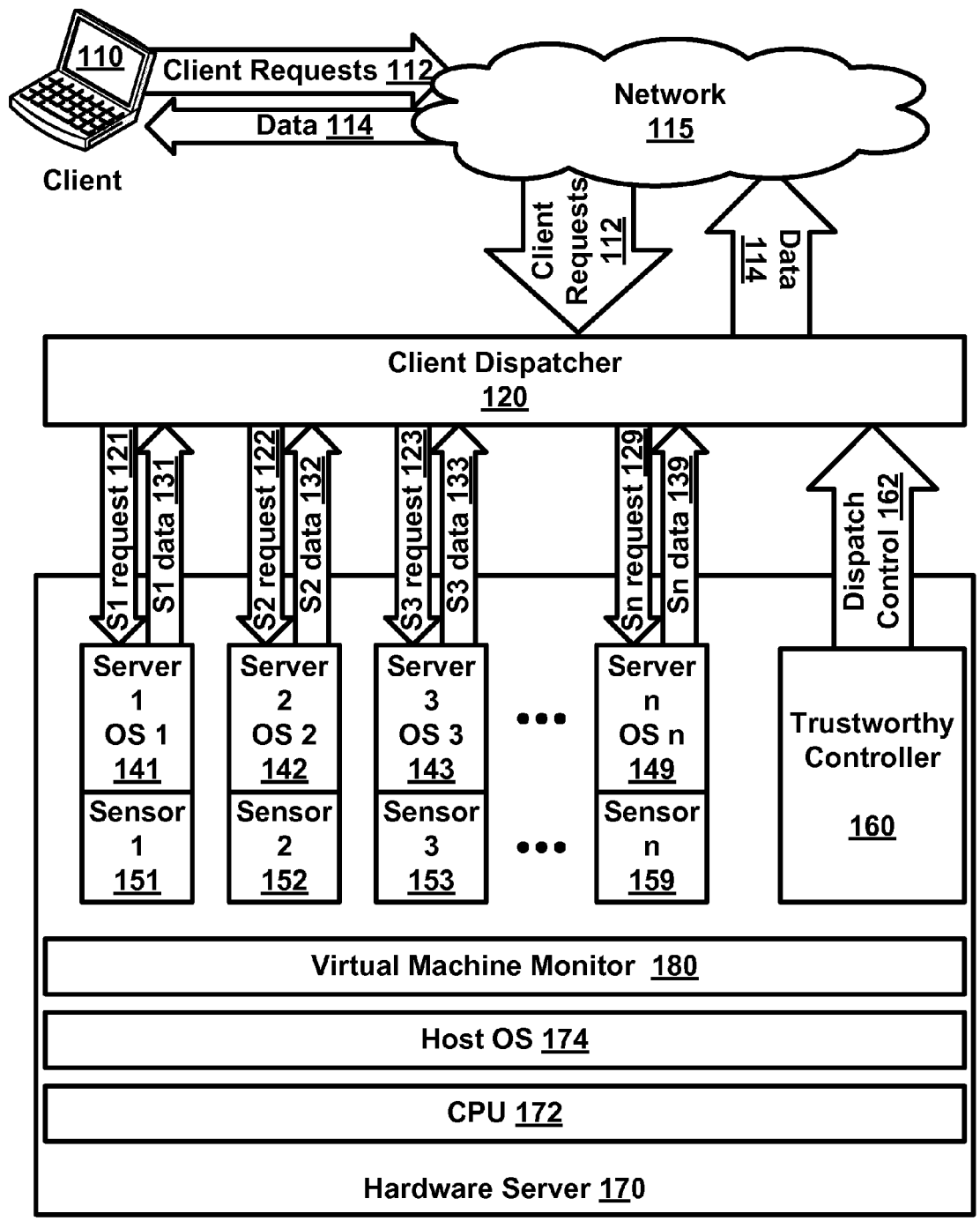
FIG. 1 is a block diagram of an attack resistant continuous network service system utilizing a multitude of virtual servers, a virtual trustworthy controller, a host operating system and a virtual machine monitor running on a hardware server as per an aspect of an embodiment of the present invention.

Embodiments of the present invention include a virtualization-based architecture of a scalable system for providing attack resistant uninterruptible network services using automatic feedback control that are configured to automatically eliminate malicious code threats against server systems while providing continuous service. The architecture utilizes replicated and diversified servers in a virtual environment controlled by a closed-loop feedback controller that uses anomaly and intrusion sensor outputs and calculates cost-weighted actions to provide continuous service while eliminating malicious threats. Systems may be constructed to handle broad classes of malicious code and code injection attacks while also tolerating software failures without requiring access to software application code. This should simplify the handling of intrusion events by greatly reducing the penalties for mishandling events: either in the form of unnecessary actions caused by false positives or the lack of actions in the case of undetected attacks. Finally, the architecture provides a framework for trading service throughput for security assurance over a given time window, and likewise for computing different autonomic actions based on service demand. Results show the system is effective in ensuring service and system integrity under several types of attacks and software faults that servers will experience with acceptable performance overhead.

In a server environment, virtualization enables a single server machine to support multiple, isolated virtual servers, and is typically used for multiple server consolidation, centralized management and administration, improved hardware utilization, and decreased total cost of ownership. Virtual servers may be created and destroyed on the fly, impose little CPU overhead when they are idle, and may be relatively easy to manage and configure. Virtualization is supported by various software solutions, such as VMware and Xen, and hardware (chip level) support from major processor vendors, such as Sun's Hypervisor, Intel's VT, and AMD's Pacifica technologies. In the following discussion, the term host-based virtualization refers to virtualization technologies that may rely on an underlying host operating system for system resource management. The term host-less virtualization, in contrast, refers to virtualization technologies running directly on the CPU and managing system resources directly.

A scalable architecture, implementations and preliminary results for an attack resistant uninterruptible server that may be constructed using virtualization and closed-loop feedback control is disclosed. The system was conceived on the notion that software is and will continue to be flawed and vulnerable to attack, and furthermore, that the cost of certain software system failures requires engineering for planned failure. An aspect of the embodiments is called a Trustworthy Controller 160. The trustworthy controller 160 may utilize virtualization to interact with a pool of diverse replicas for a given server.

Using off-the-shelf sensors and actuators, the embodiments may monitor and control the pool of servers to provide continuous service with integrity even in the face of attacks and software failures. By abstracting the servers as a pool of resources to be created, monitored, and restarted or reverted as required, the system may scale to very large numbers of software and hardware servers, providing software and hardware fault tolerance and resilience to attack.

FIG. 1 shows an example system utilizing a multitude of virtual servers (141 through 149), a virtual trustworthy controller 160, a host operating system 174 and a virtual machine monitor 180 running on a hardware server 170. As shown in this example embodiment, the trustworthy controller 160 runs in a virtual machine that monitors the health of servers (141 through 149) using a series of sensor modules (151 through 159) including anomalies in the system calls made by each server application that may indicate a break-in attempt, intrusion detection alerts from any number of commercial intrusion detection systems, performance management alerts, and an exposure timer for each server (141 through 149). The trustworthy controller 160 may determine the current state of each machine (141 through 149) based on these inputs and may select an appropriate response for each server (141 through 149). Responses include, but are not limited to, doing nothing; restarting the server application; reverting the server machine to its initial pristine state; and throttling client requests.

As shown, the embodiment runs a pool of servers (141 through 149) on one or more physical machines. The servers (141 through 149) may be virtualized servers. The collection of servers (141 through 149) may be treated as a server pool (shown in FIGS. 4 and 5 as element 450). The constituents in the Virtual server pool 450 may be dynamic. At a given time, some virtual servers are online serving client requests 112, some are taken out of the pool for offline reversion, while others are in a grace period to finish present requests 112 but do not accept new requests. Each client request 112 may be directed by a client dispatcher 120 to one of the servers (141 through 149) suitable of serving the request. Outputs of intrusion and anomaly sensors (e.g. 151 through 159) in the network, on the server boxes and inside each server (141 through 149) may provide observables (411 through 419) to the trustworthy controller 160. Typical observables (411 through 419) may include, but are not limited to server CPU/memory usage, process counts, traffic volume, system call behavior, service availability, server exposure time, and attack alarms raised by intrusion detection systems. Accessing system state using observables (411 through 419), the trustworthy controller module 160 may activates a set of actuators to address perceived threats or service deterioration. Examples of actuators include restarting services in a virtual machine, reverting server machines back to a pristine state, blocking IP addresses, or even to take a compromised server out of the pool entirely.

Some Unique Characteristics of the Embodiments

Embodiments of the present invention may use virtualization as the foundation for system integrity. In particular, a virtualization feature, called snapshot, may be used to periodically restore the pristine state of a virtual servers. Unlike system reboots, a revert operation removes both memory and file system corruptions, including rootkits, backdoors, and Trorjan horse programs. While a virtual server is being reverted, other virtual servers may still be online providing services, albeit with some performance reduction owing to the reversion overhead. Virtual server reversions may be fixed-scheduled to provide integrity guarantees for a server, event-triggered based on the severity of current intrusion events, or a combination of both. Similarly, hardware servers may be configured to allow a reversion to a pristine state. However, the design for such a server may need to ensure that all memory be reset, possibly with a predetermined image of the system.

Some embodiments may have some inherent characteristics that allow it to operate successfully in highly noisy environments typical of many intrusion detection systems with large numbers of false alarms. The embodiments simplify the handling of intrusion events because of its low penalties in mishandling events and its high tolerance for both false positives and false negatives. First, compromises caused by undetected intrusion (false negatives) may be removed by the next revert. Second, with reverts as the ultimate fallback to restore integrity, intrusion alarms can be dealt with by light-weight responses, minimizing the impact on performance even if most alarms turn out to be false.

The embodiments present an attractive option to those who face the dilemma of handling an estimated peak workload while guaranteeing non-stop service. The scalable architecture supports provisioning hardware to address estimated peak demand requirements as an effective means for mitigating performance overhead of virtualization and control events. Note that the common contingency plans of guaranteeing service typically include redundant, backup servers. Such plans address only the service availability issue, not system security. Furthermore, the processing power of the backup servers may not be utilized at all during peak workload, leading to inefficiency and under-utilization.

In contrast to the prior art described in the background section, embodiments of the present invention abstract the server into a pool of virtual resources 450 to be instantiated, monitored, and re-started or reverted as needed. Some embodiments may be scalable with hardware, which permits provisioning an arbitrary level of hardware to support required transaction throughput levels and high degrees of availability. Some embodiments may use abstractions for sensors, actuators, and closed-loop feedback control algorithms, enabling off-the-shelf or custom-built instances of these to be used and experimentally quantified.

Computer virtualization was first introduced as a product by IBM in 1972 [11, 12]. It has in recent years experienced a powerful revival. A non-exhaustive list of present virtualization technologies includes VMware products [13], Xen [14], and User Mode Linux [15, 16]. Recently, virtualization supports have been added to mainstream Linux kernels since version 2.6.20 [17]. Microsoft also offers Virtual Server 2005 [18], previously codenamed Viridian, as a free product. Also major processor vendors provide hardware virtualization support, including Intel, AMD, IBM, and Sun Microsystems. Some embodiments may be produced using technologies that allow a virtual machine to run its own operating system kernel. Additionally, other embodiments may be produced using "compartment" technologies" such as Virtuozzo and Sun Solaris Containers, which provide isolation among different services/applications running on the same server. It may even be possible to create embodiments without virtualization. An important characteristic however, is an ability to reproduce a system "snapshot" which is available with many of the noted virtualization technologies.

Basic Concepts

Figure 2:
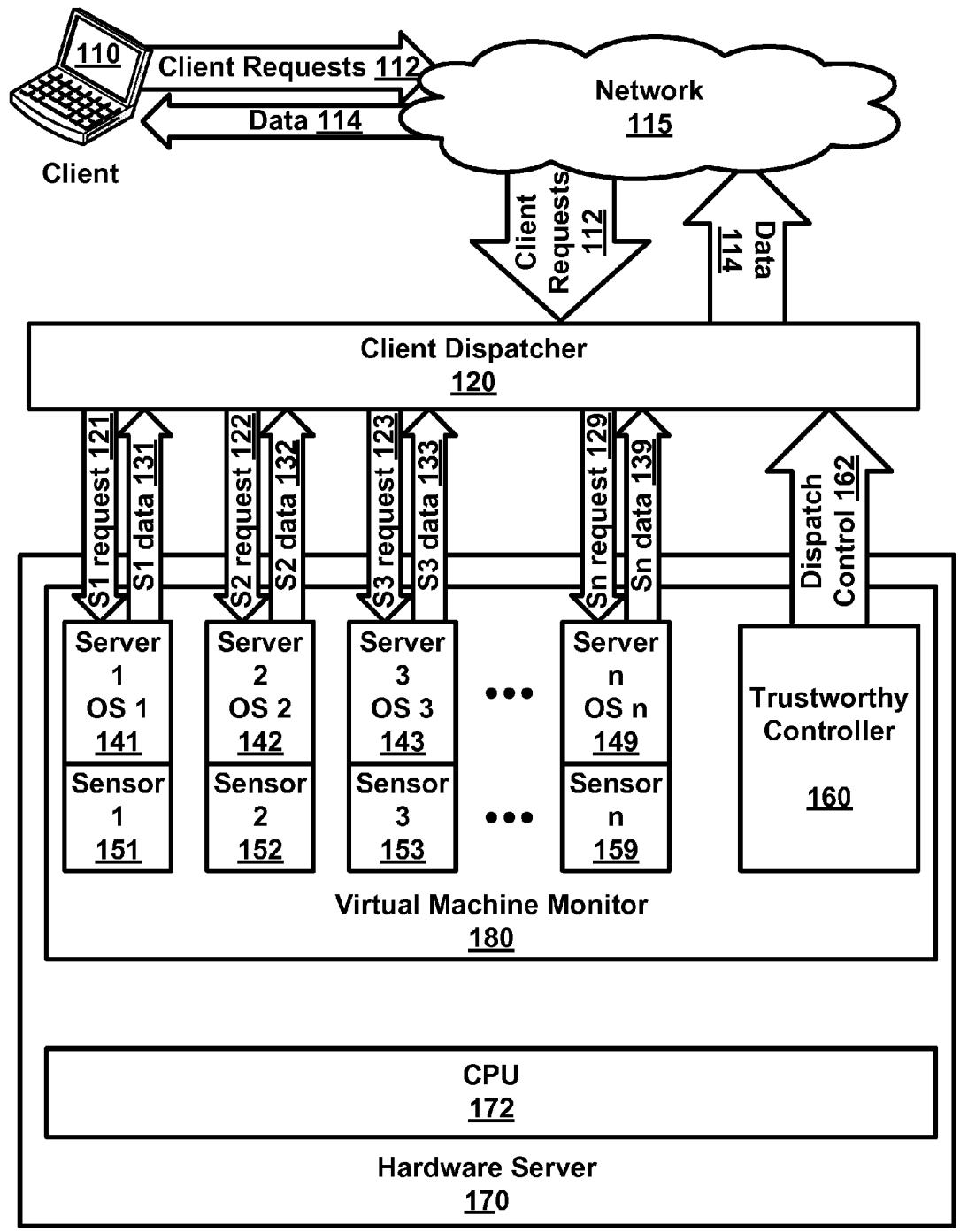
FIG. 2 is a block diagram of an attack resistant continuous network service system utilizing a multitude of virtual servers, a virtual trustworthy controller and a virtual machine monitor running on a hardware server as per an aspect of an embodiment of the present invention.
Figure 3:
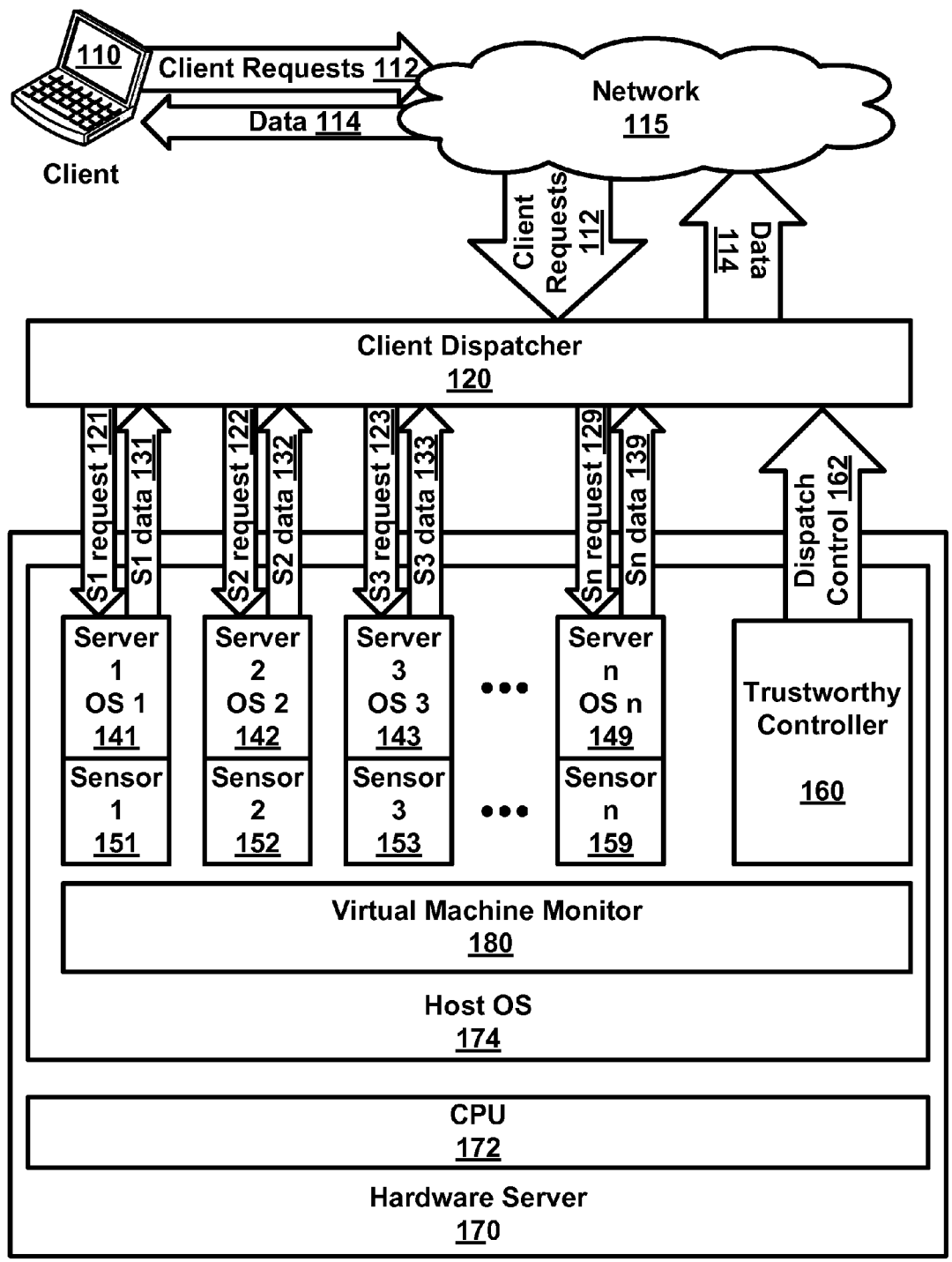
FIG. 3 is a block diagram of an attack resistant continuous network service system utilizing a multitude of virtual servers, a virtual trustworthy controller and a virtual machine monitor running under a host operating system running on a hardware server as per an aspect of an embodiment of the present invention.
Figure 4:
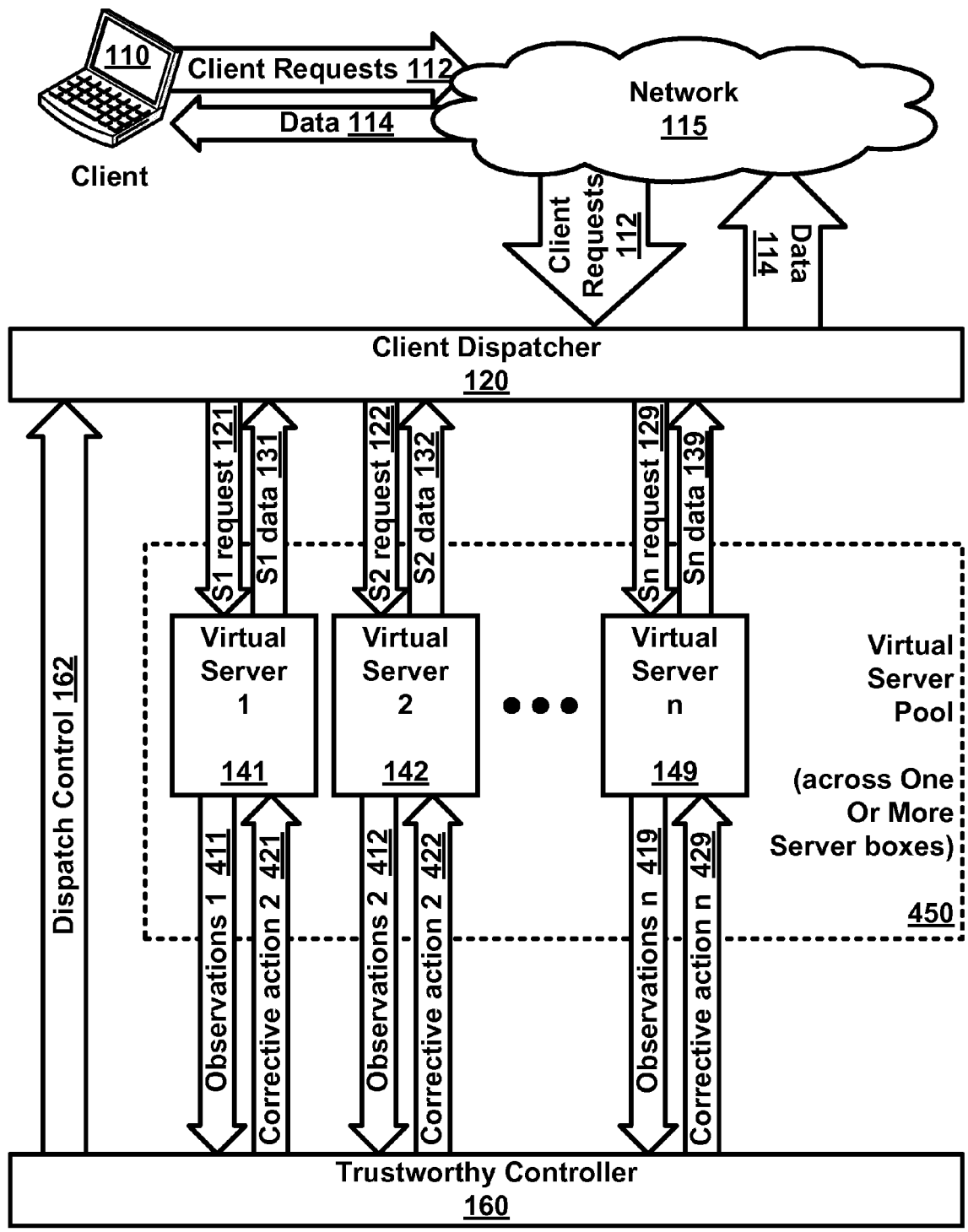
FIG. 4 is a block diagram of an attack resistant continuous network service system utilizing a multitude of virtual servers across one or more physical server boxes that are grouped as a virtual server pool as per an aspect of an embodiment of the present invention.
Figure 5:
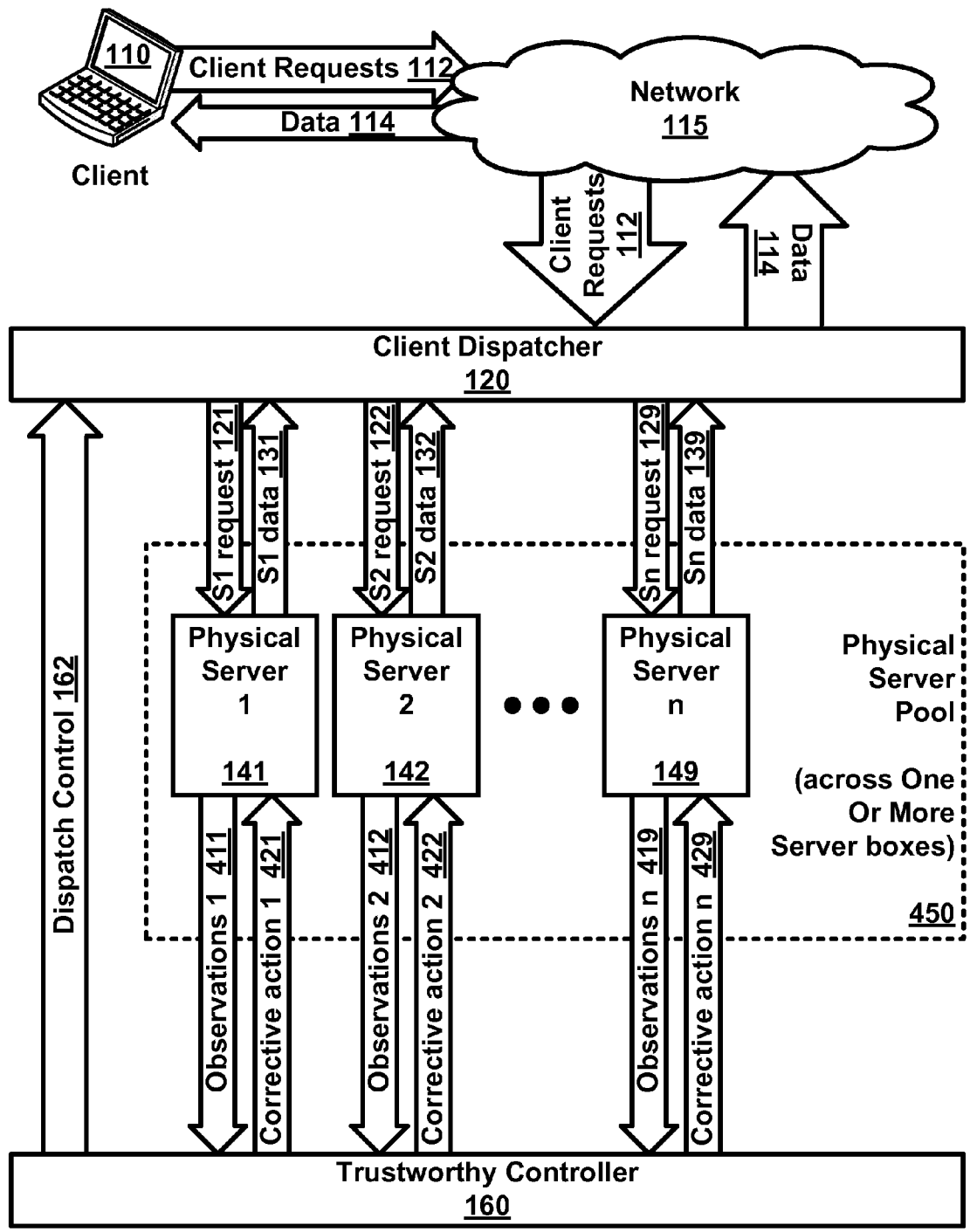
FIG. 5 is a block diagram of an attack resistant continuous network service system utilizing a multitude of physical servers grouped as a server pool as per an aspect of an embodiment of the present invention.
Figure 6:
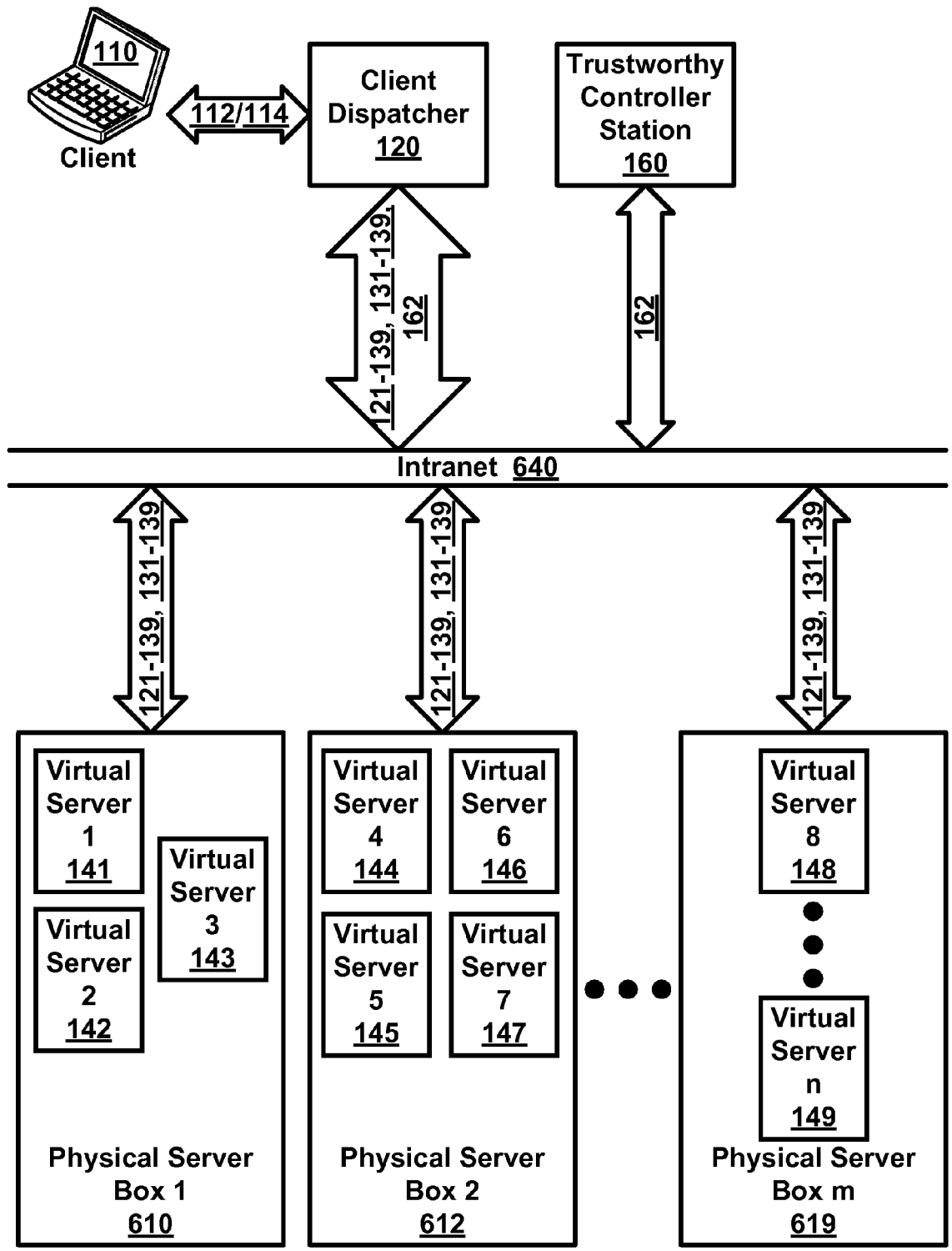
FIG. 6 is a block diagram of an attack resistant continuous network service system utilizing a multitude of virtual servers over a multitude of physical server boxes over a network as per an aspect of an embodiment of the present invention.
Figure 7:
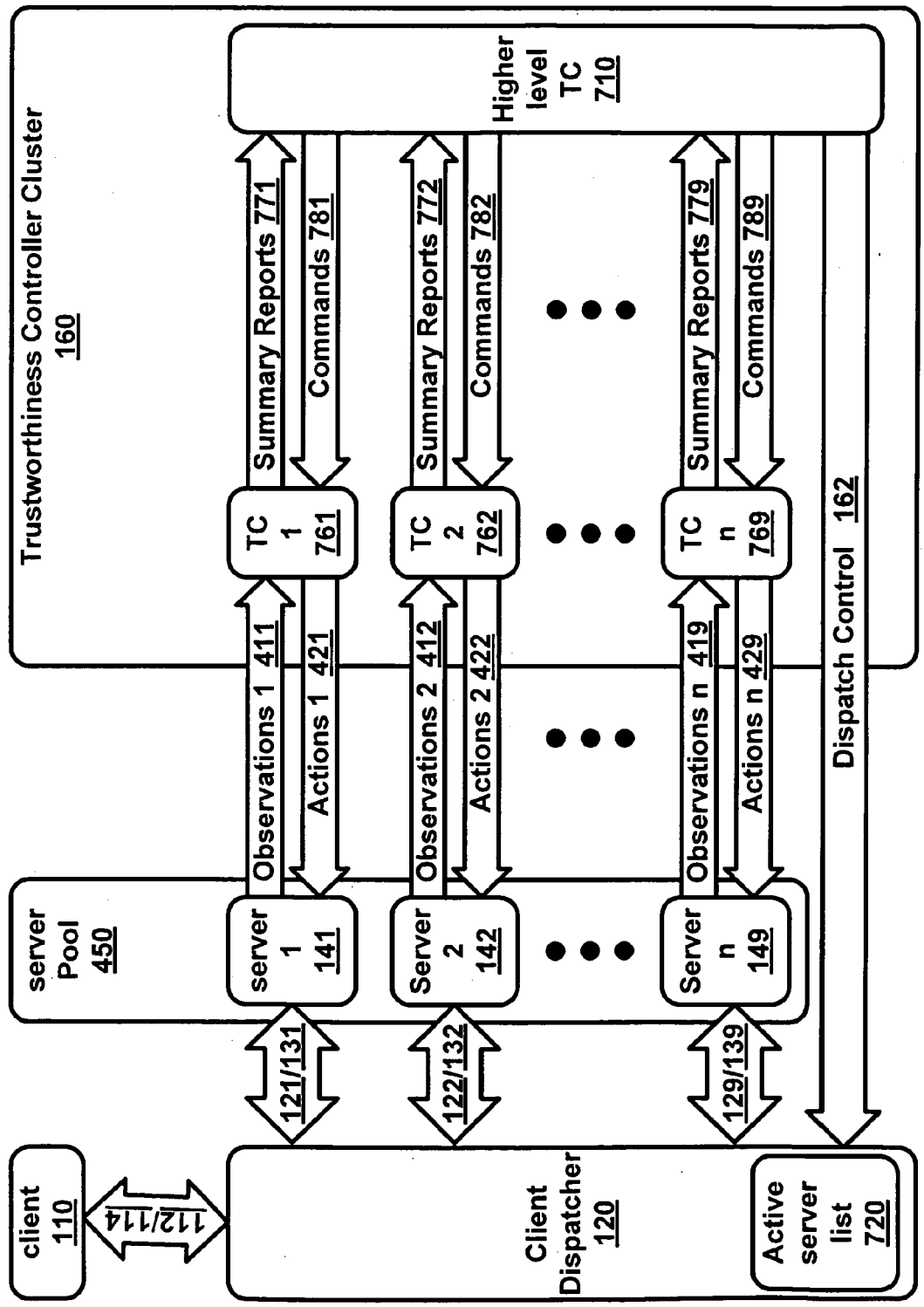
FIG. 7 is a block diagram of an attack resistant continuous network service system utilizing a cluster of trustworthiness controllers as per an aspect of an embodiment of the present invention.

A trustworthy controlled based system may use one or more server machines to provide a set of services to clients. In addition to FIG. 1, FIGS. 2 through 7 show several different (non-inclusive) examples of embodiments of an attack resistant continuous network service system utilizing a trustworthy controller 160. FIG. 2 shows an example system utilizing a multitude of virtual servers (141 through 149), a virtual trustworthy controller 160 and a virtual machine monitor 180 running on a hardware server 170. FIG. 3 shows an example system utilizing a multitude of virtual servers(141 through 149), a virtual trustworthy controller 160 and a virtual machine monitor 180 running under a host operating system 174 running on a hardware server 170. FIG. 4 shows an example system utilizing a multitude of virtual servers (141 through 149) across one or more physical server boxes that are grouped as a virtual server pool 450. FIG. 5 shows an example system utilizing a multitude of physical servers grouped as a server pool 450. FIG. 6 shows an example system utilizing a multitude of virtual servers (141 through 149) over a multitude of physical server boxes (610 through 619) over a network 640. FIG. 7 shows an example system utilizing a cluster of trustworthiness controllers (761 through 769).

As shown in FIG. 6, physical server machines (610, 612 and 619) do not provide services directly but instead run multiple and possibly diversified instances of virtual servers (141 through 149).

Each virtual server (141 through 149) may provide only a single network service. If more than one network service is required, each service may have its own set of dedicated virtual server(s). In fact, some embodiments encourage the specialization of service tasks in virtual servers. Functional specialization may lend itself to a simplified application environment, which should reduce software bugs and vulnerabilities in the first place. In addition, more specific services may also lead to more specific security requirements and policies, which in turn should facilitate anomaly detection. As an example, by dividing the tasks of a mail server into an inbound mail server and an outbound mail server, there are two different servers with drastically different behaviors and security requirements. As a starter, an inbound mail server may only acceps incoming SMTP (Simple Mail Transfer Protocol) connections but may never initiate outgoing SMTP connections. Outgoing SMTP connections may be the specialized task assigned to the outbound mail server. It is obvious that anomaly detection in each server may be made easier with such clearly distinguished behaviors. While function specialization is not a requirement of all of the embodiments, it may provide more upfront resilience, which in turn, may result in fewer control events and higher sustained throughput as a consequence.

In addition to function specialization, some embodiments may also encourage implementation diversity. Servers may be diversified in their memory layout by compilation, in their operating system, or by providing suitable substitutions of one server product for another. The pool of virtual servers providing the same service may use different combinations of guest operation systems and application software. Diversities in service implementations may result in non-overlapping vulnerabilities, providing additional robustness against attack. For example, for a web server, it may be desirable to provide operating system diversity such as running Apache on Red Hat Linux in one virtual server, and BSD and Solaris on other virtual servers. Likewise, where possible combining operating system diversity with server diversity may be more desirable, e.g., running Microsoft IIS on Microsoft in one virtual server, in conjunction with Apache on BSD. It is pointed out that some OS-Application combinations are easier than others to produce identical service behaviors. For instance, it should not be difficult to configure a BSD-Apache combination and a Linux-Apache combination to behave in exactly the same way. It could be a daunting task, on the other hand, to have a Microsft IIS server produce exactly the same behavior as a BSD-Apache combination. Diversification is not a requirement, but may make each server more resilient to attack by providing a different set of vulnerabilities on each transaction request.

Virtualization technology should facilitate the aforementioned possibilities of specialization and diversity. Several of the disclosed embodiments lend themselves to taking full advantage of the potential in enhancing security and service availability.

As shown in FIG. 6, a client dispatcher 120 is placed in front of the server machines (610 through 619) to distribute client requests (112 via 121 through 129) and their responses (114 via 131 through 139) among the virtual servers (141 through 149) that are suitable for servicing the requests (112 via 121 through 129). An off-the-shelf load balancer, Pure Load Balancer, or the like may be used as a client dispatcher 120. At the center of the architecture is a Trustworthy Controller (trustworthy controller) station 160 that receives health status reports (411 through 419) from each virtual server (141 through 149), determines the state of virtual server (141 through 149), and takes appropriate actions (421 through 429) to mitigate the deterioration of virtual server state. Specifically, some of the embodiments use virtualization, sensor module(s) 830, closed loop control and actuator module(s) 840.

Some embodiments use a feature of server virtualization—snapshots. A snapshot may be taken of a server (141 through 149) (virtual or otherwise) at a time when the server (141 through 149) was cleanly installed, booted up, ready to serve but still disconnected to the outside. The result should be a pristine state of the server to return to whenever the server (141 through 149) is suspected of corruption. This approach lends itself to front-end transactional services well that characterize a large portion of network services.

Sensor modules (830 and/or 151 through 159) may be used by the trustworthy controller station 160 in each server (141 through 149), in the network and/or on the server boxes (610 through 619) to determine the state of the system components. The sensor module (830 and/or 151 through 159) may utilize intrusion detection sensors 1110, anomaly detection 1130 or system performance sensors 1140. However, one does not have to assume sensor outputs 835 are completely accurate: in many cases sensors 1010 may be noisy and one may assume there will be false positives and false negatives in sensor reports. One embodiment uses an off-the-shelf anomaly detection sensor 1130 in the virtual servers (141 through 149). In addition to standard sensors, an exposure timer 1150 may be used for the server (141 through 149) as an additional input to a control algorithm. The exposure timer 1150 may be a running clock for how long the server has been running, or exposed to the Internet. This exposure timer 1150 may be used as a countdown timer to provide guarantees on the integrity of each server (141 through 149).

Closed-Loop Control and Actuators.

Based on current virtual server sensor reports 835, and prior history, the trustworthy controller station 160 may determine when and which actions 825 to take against virtual server state deteriorations—closing the control loop in the system architecture. Such actions 825 may be local or system wide depending on their impact on the entire system. Actuators module corrective actions (421 through 429) may include re-starting anomalously behaving processes, reverting a virtual server back to its pristine snapshot, and other potential defenses, such as throttling or blocking client requests. The client dispatcher 120 may be included in the control loop to ensure seamless client handling and maximum system performance.

A control algorithms may be used in the control loop that includes a rule-based engine that triggers one of the responses based on exceeding configured thresholds for any or some combination of the inputs, as well as more sophisticated control algorithms including stochastic control which determines the appropriate response based on the estimated state of the server based on prior history. In the simplest embodiment of a rule-based engine, a set of rules may be defined that will take a measured response to changing server conditions. For example, if the anomaly detector or performance monitor indicates minor anomalous behavior of a server, then the server application can be re-started. If the anomaly detector or intrusion sensor indicates a severe anomaly or a known intrusion, then the server can be restored back to its pristine state. If the exposure time for the server exceeds a configurable exposure bound, then the server can also revert back to its pristine state.

It must be emphasized that reversions to snapshots are different from system reboots. The snapshot of a server (141 through 149) comprises the memory and disk images of the server (141 through 149) at a point in time. Following operations on the disk of the server (141 through 149) uses the copy-on-write (COW) technique to keep new disk updates on a separate disk image. Reverting the server (141 through 149) to a snapshot may involve restoring its memory image and discarding the disk writes after the snapshot. With good implementations, virtual server reverts can be very efficient. Using VMware products, for example, a virtual server revert with 256 MB of memory takes from 3 to 20 seconds, depending on system workload. During the reversion period, other virtual servers (141 through 149) may still be online and providing services, although with a certain degree of performance degradation due to reversion overhead consuming CPU cycles. In comparison, system reboot times (be it a virtual or real server reboot) are typically measured in minutes. Furthermore, a system reboot may remove only corruptions in memory but not those in the file system. The time to remove file system corruptions, such as rootkits and Trojan horses, is hard to estimate, for it depends on the skill of the administrator and the available knowledge of the attack in question. Many administrators simply perform a complete reinstallation in order to be absolutely certain of system integrity—a process that may take hours. A revert operation, on the other hand, may wipe clean both memory and file system corruptions in seconds and ensures the system is restored to a pristine state.

Trustworthy Controller Cluster 160 Components.

Some trustworthy controllers may be embodied using a cluster of smaller trustworthy controllers (761 through 769). FIG. 7 is a block diagram of an example attack resistant continuous network service system utilizing such a cluster of trustworthiness controllers (761 through 769). On the left-hand side of FIG. 7 are virtual servers (141 through 149) which could be running on one or more physical server machines (161 through 169). The components running on the trustworthy controller station 160 may be on a physically separate machine or in a separate virtual machine.

The trustworthy controller 160 architecture may use a multi-level (shown here in this example with two-levels) control mechanism for scalability. As seen in FIG. 7, each virtual server (141 through 149) may have a corresponding trustworthy controller (761 through 769). These trustworthy controllers (761 through 769) may be virtual server Handlers (or virtual serverH) running on the trustworthy controller station 160 to receive sensor reports (411 through 419) from its virtual server (141 through 149). The trustworthy controllers (761 through 769) may be empowered to take "local" actions in a best-effort attempt to resolve corruptions with minimal overhead. Local means actions specific to its virtual server (141 through 149) with negligible system-wide impacts. These low-cost actions (421 through 429) may include restarting the service if it is reported unavailable, and killing suspicious processes that start up.

The virtual trustworthy controllers (761 through 769) may periodically report state summaries (771 through 779) of its virtual server (141 through 149) to a higher level trustworthy controller 710. The following discussion discusses a software implementation of a trustworthy controller station 160 using virtual servers (141 through 149). Handling only virtual server state summaries (771 through 779) frees the higher level trustworthy controller 710 running on a trustworthy controller station 160 from micromanaging virtual servers (141 through 149) to focus on system-wide issues. Report from network-wide intrusion detection and system-wide performance monitoring tools may be fed to the higher level trustworthy controller 710 for system wide management, such as re-allocating resources among virtual servers (141 through 149), migrating virtual servers (141 through 149) to physical machines with light workload, and/or reverting the virtual servers (141 through 149) to pristine state snapshots. Distributing this functionality is not only efficient, but also scalable for large numbers of virtual servers.

Note that reverting a virtual server (141 through 149) to a pristine snapshot may eliminate potential threats by wiping out all corruptions/comprises, malicious software and remote hacks regardless whether they are detected by sensors or not. For this reason, the trustworthy controller 160 architecture may impose an upper limit on the virtual server exposure time (30 minutes in one prototype, but configurable in general). When a virtual server (141 through 149) reaches its exposure time limit, maintained by the trustworthy controller (171 through 179), the virtual server (141 through 149) may be reverted even in the absence of negative reports. While this may seem unnecessary, it may be the best recourse for dealing with undetected compromises, with the additional benefit of software rejuvenation, which is meant to counter the effects of "software aging" where the state of software degrades with time [10]. In addition, it may be found that the performance overhead and resulting throughput degradation by periodic reversions to be acceptable. Effectively, the trustworthy controller 160 architecture as shown in FIG. 7 has two layers of defenses against attacks. First, intrusions against virtual servers (141 through 149) will be immediately countered by the corresponding trustworthy controller virtual serverH (171 through 179) when reports arrive. Second, weighted reversion schedule may be utilized, where accumulated anomaly or intrusion reports from a given virtual server (141 through 149) will prompt the trustworthy controller to revert the virtual server earlier, while good reports will weight it back to its fixed reversion schedule. In general, the worse the accumulated reports, the earlier the reversion occurs.

Note that a virtual server revert may be considered a system-wide action, even though it concerns only a single virtual server (141 through 149). This is because the reversion overhead is significant on the CPU and thus has system-wide performance ramifications. Consequently the decisions and scheduling of virtual server reverts may be handled by the higher level trustworthy controller 710, not trustworthy controller virtual serverHs (171 through 179). In this way, the trustworthy controller 710 control algorithm may take system workload factor into revert decisions, that is, the trustworthy controller 710 may prolong system reversions during peak workload to have minimal impact on service throughput, or provide more rapid response reversions during periods of light loading.

Lastly in FIG. 7, the decision to revert or restart an individual virtual server (141 through 149) may be communicated from the trustworthy controller 160 to the client dispatcher 120 as a dispatch control message 162, prior to the action taking place, which enables the load balancer to re-assign future client requests 112 to other available virtual servers (141 through 149), while completing the current connection to the virtual server (141 through 149) about to be restarted or reverted to provide uninterrupted service.

Discussion

Performance versus Security. The disclosed embodiments enable interesting trade-offs between performance and security. One on extreme, high security can be achieved with very frequent reverts (e.g., reverting a virtual server every 60 seconds). This minimizes the exposure time of a server (141 through 149) to a minimum time window. In this way any hacker's foothold on a virtual server (141 through 149) will be removed quickly, even if an intrusion is not detected. The overhead of high revert rates, however, will significantly reduce the sustainable throughput of the system. On the other hand, if the virtual server exposure timer is set very high (e.g., months), then the performance penalty of reversions is minimized, but the exposure time window is large enough that malicious software or hackers may run unimpeded for this duration. If the attackers do not take down the machine, then the machine will remain available potentially at a high system throughput, but also potentially with compromised services.

This tension may become apparent when the system is heavily loaded with client requests 112 and also under attack. Under such conditions, the system architecture may be tuned to either maintain high system throughput or enforce security. To favor high throughput, the system architecture under heavy load may need to restrain itself from costly actions such as reversions, by performing low-cost actions (e.g., client throttling, IP blocking, process re-starting). To favor security, a trustworthy controller 160 may need to be aggressive in counter-attack actions regardless the penalty in performance. Experimental analysis depicts the trade-offs between security and performance. One approach to balance these concerns is to use the load of the system as a parameter to a control algorithm, such that heavy-weight actions require significant intrusion events during times of heavy load, while in times of light loading, system reverts may be taken more readily with minimal impact to client-side performance metrics.

Stateful Services.

A stateful service is a service that maintains state information between message calls. At the first glance, the system architecture seems incompatible with stateful services. A stateful server needs to keep certain amount of client-specific history information. The responses to identical requests may differ because of the outputs of previous actions (e.g., whether a client authentication was successful). The traditional solution to the problem is the "sticky session" mechanism, whereby the load balancer 120 keeps track of the client-to-server mappings and will continue to direct a client to the same (virtual) server until the session expires. With the trustworthy controller architecture, however, all history information may be lost when a virtual server is reverted.

However, a recent trend toward and advances in high-availability computing are changing the picture. From the viewpoint of high availability, the sticky session mechanism has the obvious problem that, when a server fails, all clients assigned to that server are lost. High-availability technologies introduce mechanisms to share state information among servers, typically through backend storage or local area network multicast. In light of the above observations, the trustworthy controller architecture has two options to support stateful network services. First, any failover solutions developed for high-availability computing can be used to switch a client to a different virtual server (141 through 149) should his/her original virtual server (141 through 149) has been chosen for reversion. Second, grace periods may be introduced to accommodate ongoing sessions. During its grace period, a virtual server (141 through 149) will not accept new clients but will continue to finish present sessions. Many critical applications may also impose an upper bound on session lengths. An online banking session lasting for days, for instance, is most likely caused by a careless client forgetting to logout. For such applications, it is perfectly reasonable, if not absolutely necessary, to force a timeout after, say, 60 minutes. With a well-defined maximum session length, the trustworthy controller 160 should be able to enforce periodic virtual server reverts.

For a given stateful service, the eventual solution will likely be a combination of both options. For instance, the grace period may be not as long as the maximum session lengths but rather be determined by the times needed for a retiring (virtual) server (141 through 149) to share its state with other virtual servers (141 through 149). However, it may be true that not all stateful services are compatible with periodic virtual server reverts. Telnet is a possible obvious example. While developing service failover solutions is outside the scope of this research, the continuing advances of high availability computing will increase applicability of the trustworthy controller architecture to important stateful services.

Additional Embodiments

Figure 8:
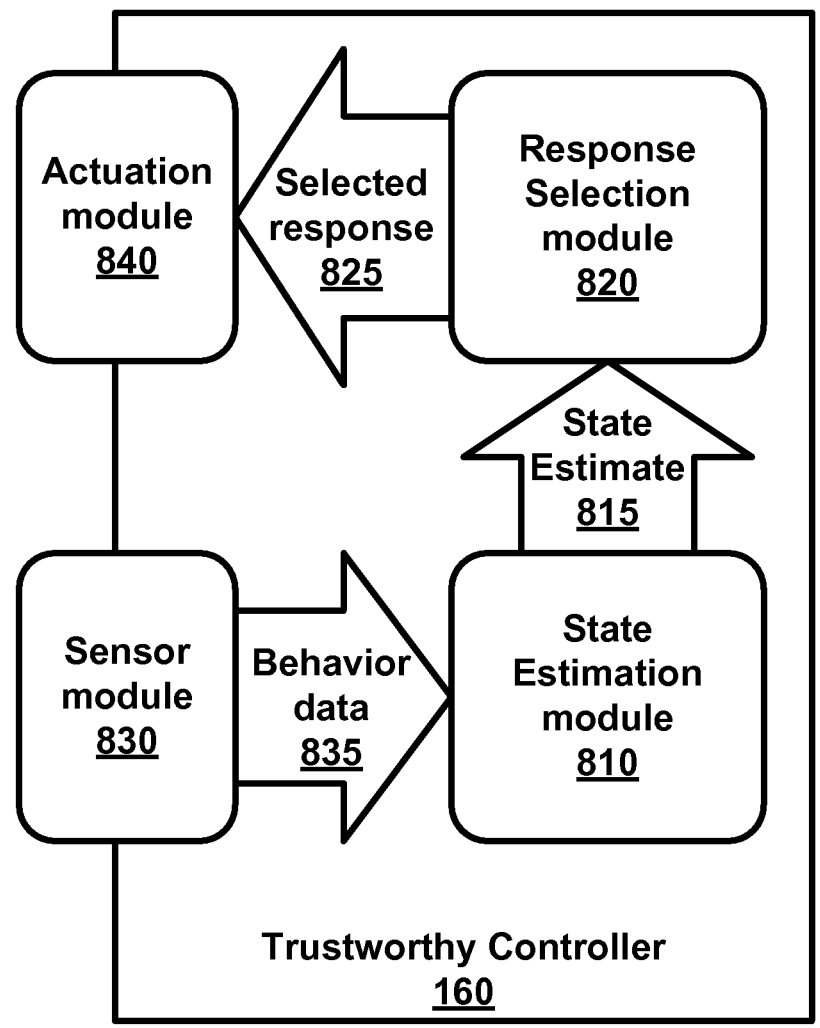
FIG. 8 is a block diagram of a trustworthiness controller as per an aspect of an embodiment of the present invention.
Figure 9:
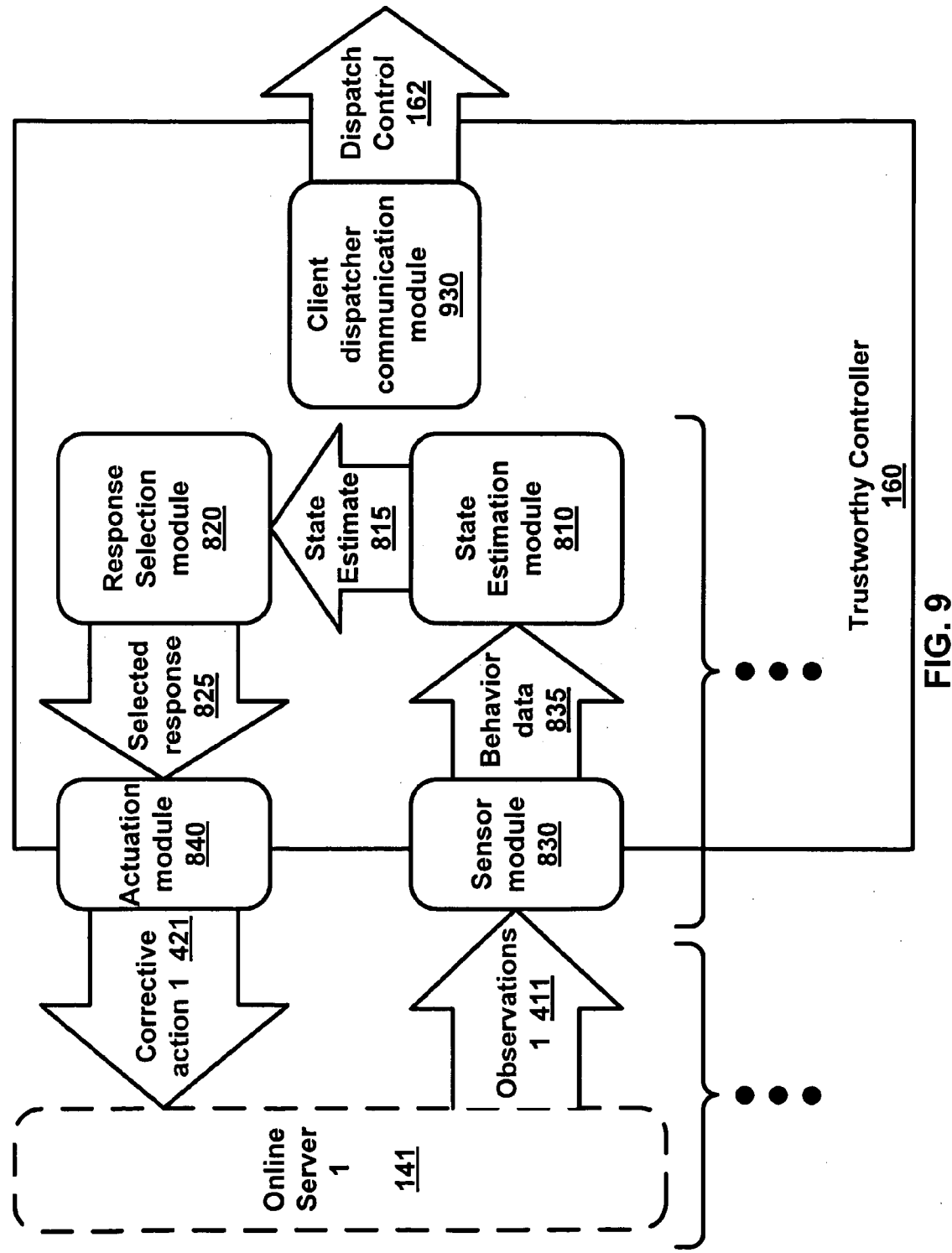
FIG. 9 is a block diagram of a trustworthiness controller interacting with an online server using an actuator module and a sensor module as per an aspect of an embodiment of the present invention.
Figure 10:
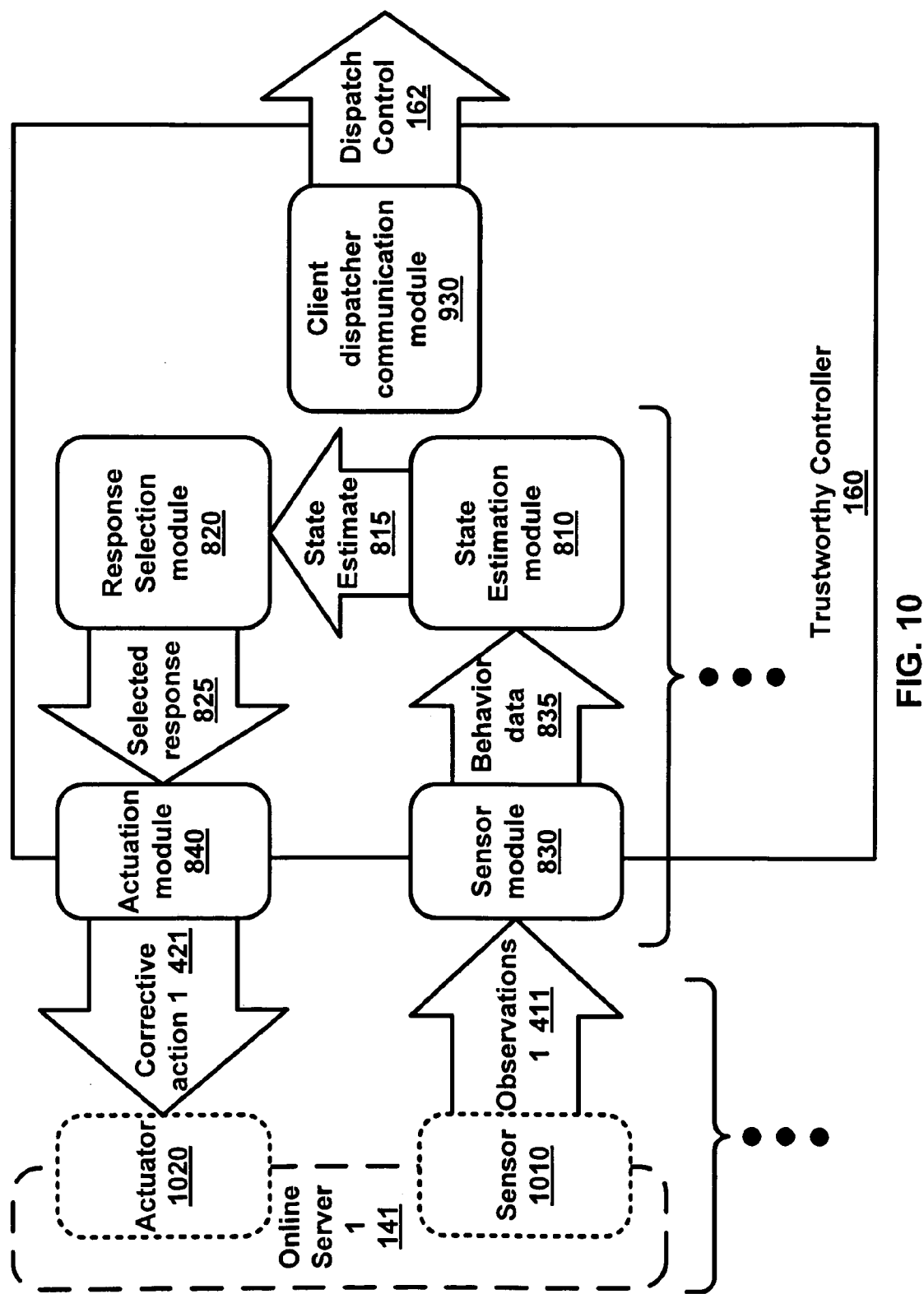
FIG. 10 is a block diagram of a trustworthiness controller interacting with an online server using an actuator module, an actuator, a sensor module and a sensor as per an aspect of an embodiment of the present invention.

FIG. 8 is a basic block diagram of a trustworthiness controller 160 including a sensor module(s) 830, state estimation module(s) 810, response selection module(s) 820, and actuation module(s) 840. FIG. 9 is a block diagram of the trustworthiness controller 160 interacting with an online server using an actuator module 840 and a sensor module 830. FIG. 10 is a block diagram of a trustworthiness controller 160 interacting with an online server using an actuator module 840, an actuator 1020, a sensor module 830 and a sensor 1010.

Figure 11:
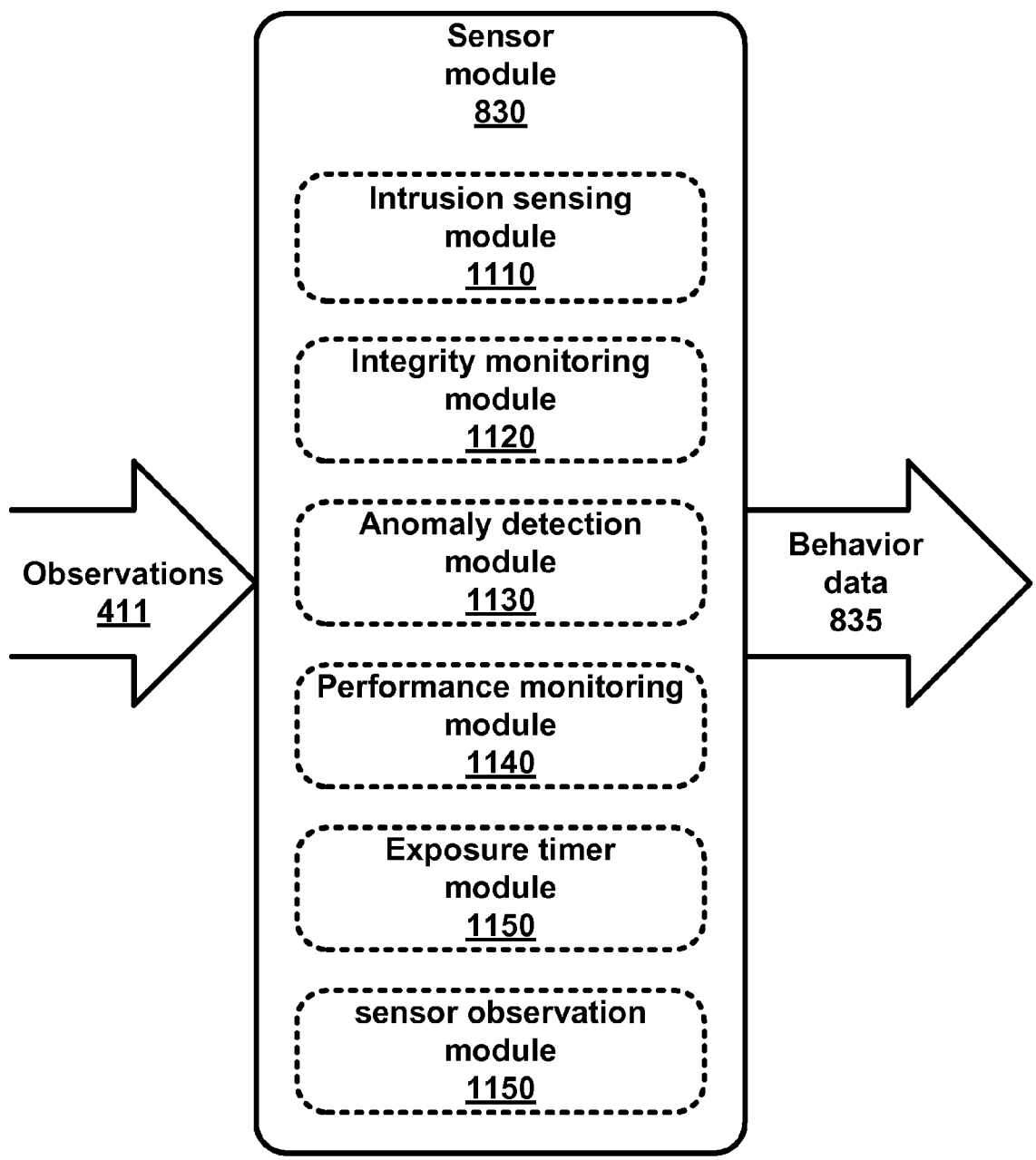
FIG. 11 is a block diagram of a sensor module as per an aspect of an embodiment of the present invention.

The sensor module 830 is shown in FIG. 11. The sensor module(s) 830 are configured to generate behavior data 835 for at least one of the online server(s) (141 through 149). The online server(s) (141 through 149) may be physical or virtual servers that may be on different physical servers (610 through 619). As shown the sensor module may include: an intrusion sensing module 1110, an integrity monitoring module, 1120, an anomaly detection module 1130, a performance monitoring module 1140, an exposure timer module 1150, a sensor observation module 1160, or any combination thereof. The intrusion sensing module 1110 may be configured to detect an external intrusion(s) into online server(s) (141 through 149). The integrity monitoring module 1120 may be configured to detect an unauthorized change to one of the online server(s) (141 through 149). The anomaly detection module 1130 may be configured to detect behavior by at least one of the online server(s) (141 through 149) that is indicative of an intrusion. The performance monitoring module 1140 may be configured to detect an unpredicted decrease in the performance of at least one of the online server(s). The exposure timer module 1150 may be configured to limit a window of vulnerability to at least one of the online server(s) (141 through 149). The sensor observation module 1160 may be configured to collect sensor 1010 specific observation data 411 from at least one of the online server(s) (141 through 149).

Figure 12:
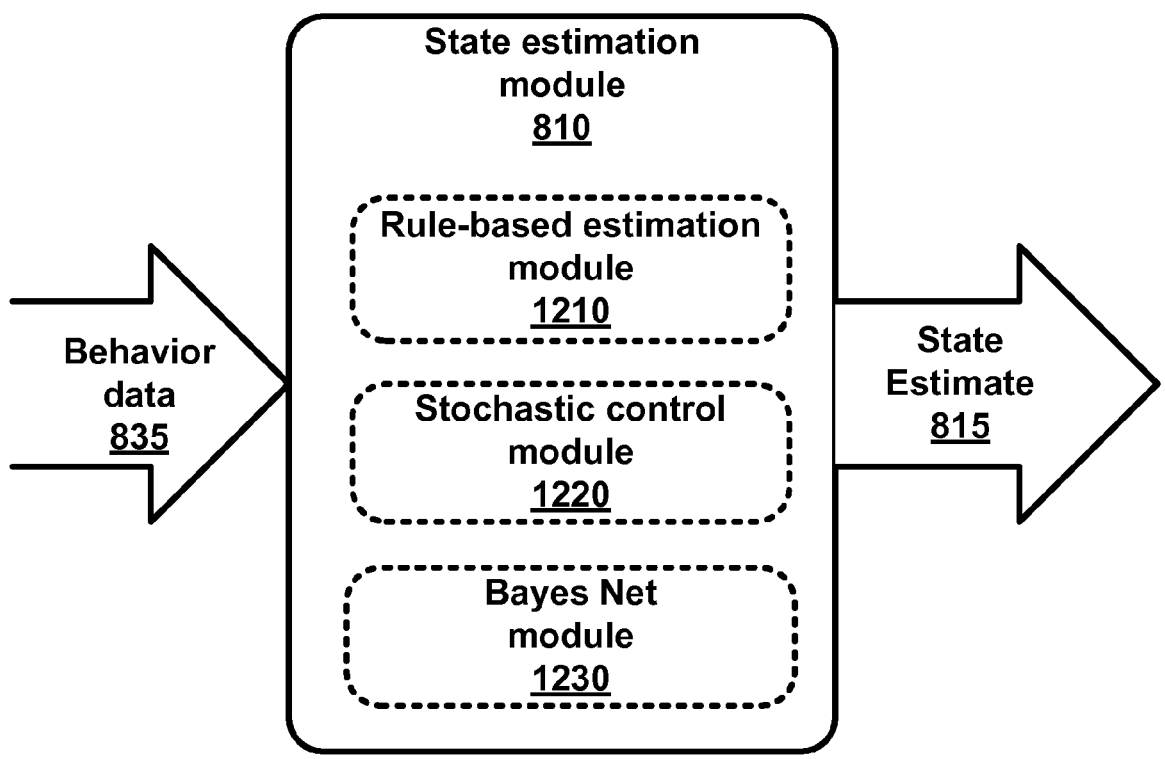
FIG. 12 is a block diagram of a state estimation module as per an aspect of an embodiment of the present invention.

The state estimation module 810 is shown in FIG. 12. The state estimation module(s) 810 may be configured to generate at least one state estimate 815 using the behavior data 835 for the online server(s) (141 through 149) using at least one of the following: a rule-based estimation module 1210, a stochastic control module 1220, a Bayes Net module 1230, or any combination thereof. The rule-based estimation module 1210 may be configured to influence at least one of the state estimate(s) 815 using a rule that evaluates behavior data 835 of at least one of the online server(s) (141 through 149). The stochastic control module 1220 may be configured to influence at least one of the state estimate(s) 815 using current behavior data 835 and historical behavior data of at least one of the online server(s) (141 through 149). The Bayes Net module 1230 may be configured to influence at least one of the state estimate(s) 815 using current behavior data 835 conditioned on prior behavior data of at least one of the online server(s) (141 through 149).

The response selection module(s) 820 are configured to determine at least one selected response 825 to maintain the availability and integrity of the online server(s) (141 through 149) when a state estimate (815) indicates that the integrity of an online server (141 through 149) is compromised.

Figure 13:
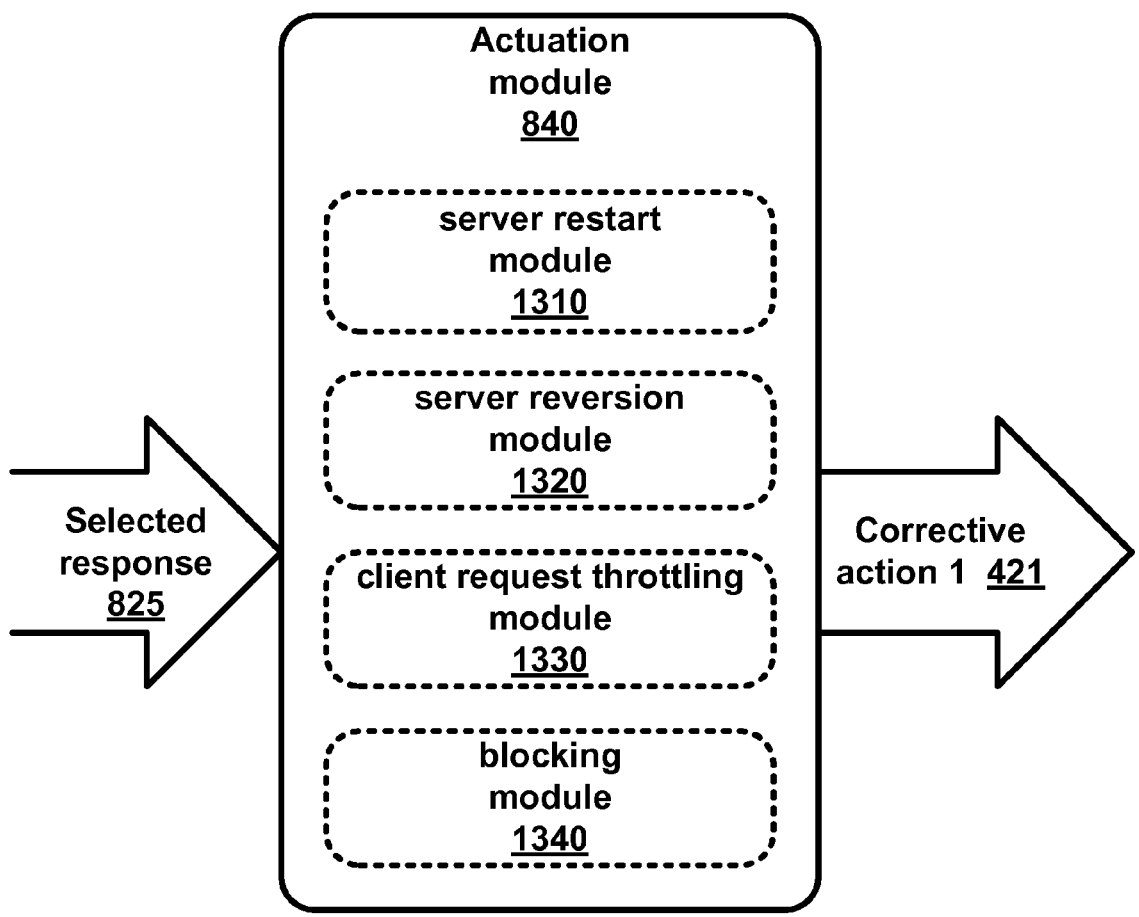
FIG. 13 is a block diagram of an actuator module as per an aspect of an embodiment of the present invention.

The actuation module 840 is shown in FIG. 13. The actuation module(s) 840 are configured to activate at least one actuator (1020) using a corrective action 421 that is based upon the selected response 825 to facilitates at least one of the following: a server restart module 1310, a server reversion module 1320, a client request throttling module 1330, a blocking module 1340, or any combination thereof. The server restart module 1310 may be configured to terminate and restart a server. The server reversion module 1320 configured to revert a virtual machine to a predetermined state. The client request throttling module 1330 may be configured to throttle client requests. The blocking module 1340 may be configured to block client requests.

The client dispatcher communication module 930 may be configured to communicate online server availability information 162 to a client dispatcher 120. The online server availability information 162 may also be referred to as dispatch control.

The trustworthiness controller 160 may also include a higher level controller 710, an incoming communications module and an outgoing communication module. The higher level controller may be configured to manage a multitude of trustworthiness controllers (761 through 769). The incoming communications module may be configured to receive instructions or commands (781 through 789) from a higher level controller 710. The outgoing communication module may be configured to communicate summary reports (771 through 779) to the higher level controller 710.

The trustworthy controller 160 may be included in a trustworthy network server system. The trustworthy network server system may, in addition to the trustworthy controller 160, also include: at least one hardware server 170, at least one virtual server (141 through 149), a client dispatch module 120, and at least one virtual machine monitor 180. The hardware server 170 may be configured to host at least one virtual machine. At least one of the virtual server(s) (141 through 149) may reside on at least one of the virtual machine(s). At least one of the virtual server(s) (141 through 149) may be a single-purpose application server. The client dispatch module 120 may be a load balancer and may also be configured to: maintain a list of available virtual servers 720 and to route at least one client request to at least one of the available servers listed on the list of available virtual servers.

The virtual machine monitor 180 may be configured to manage at least one of the virtual machine(s). The virtual machine manager 180 may also be configured to: create a pool 450 of the at least one virtual machine; and execute at least one instruction from at least one of the trustworthiness controller module(s).

Figure 14:
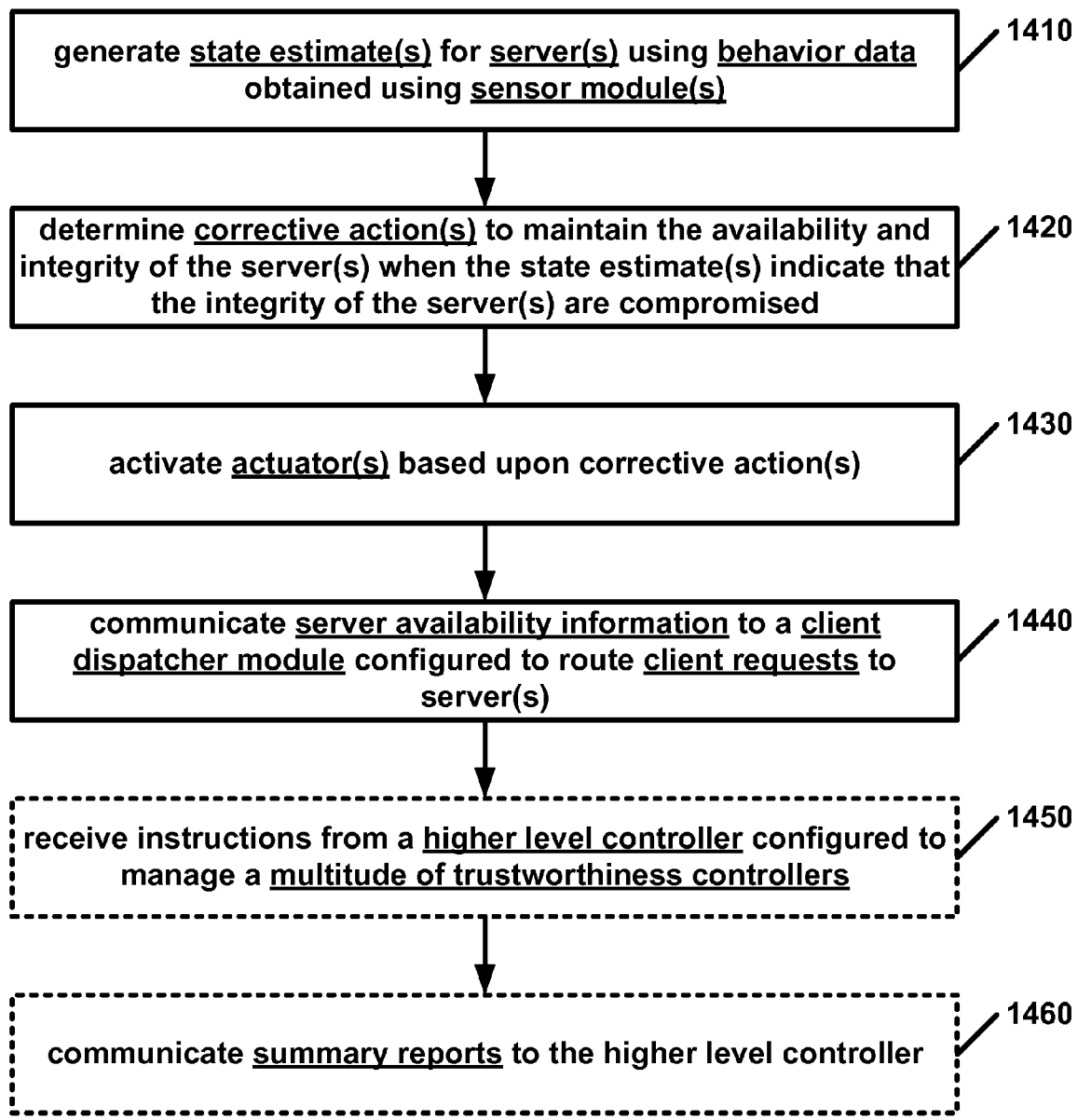
FIG. 14 is a flow diagram of an aspect of an embodiment of the present invention.

Some embodiments of the present invention may be embodied as a computer-readable media tangibly embodying a program of instructions executable by a computer to perform a method for maintaining the availability and integrity of at least one virtual server. FIG. 14 is a flow diagram an example of such a method. At 410, state estimate(s) 815 may be generated for at least of the virtual server(s) (141 through 149) using behavior data 835 obtained using at least one sensor module 830. At least one selected response 825 may be determined at 1420 to maintain the availability and integrity of at least one of the virtual server(s) (141 through 149) when the state estimate 815 indicates that the integrity of at least one of the virtual server(s) (141 through 149) is compromised. At least one actuator 1020 may be activated based upon at least one of selected response(s) 825 at 1430. At 1440, virtual server availability information 162 may be communicated to a client dispatcher module 120. The client dispatcher module 120 may be configured to route client requests 112 to at least one of the selected virtual server(s) (141 through 149). The client dispatcher module 120 may be further configured to maintain a list of available servers 720.

Additionally, instructions from a higher level controller 710 may be received configured to manage a multitude of trustworthiness controllers (761 through 769) at 1450 and summary reports (771 through 779) may be communicated to the higher level controller 710 at 1460.

Prototype Design

A first-generation proof-of-concept prototype was built to verify the trustworthy configuration of the prototype. The hardware configuration for the prototype comprised two layers of networks. On the right hand side, the network 10.0.0.0/16 represents a makeshift public network connecting to the clients. On the left hand side, the network 192.168.0.0/24 represents a private intranet of physical and virtual servers. The testbed includes a single server machine, a Dell Workstation configured with an Intel Core 2 Dual processor (two cores) and 2 GB of memory. Because all the virtual servers provide identical services in the prototype, the client dispatcher in the prototype is called the Load Balancer (LB), which is a Sun Fire 4400 server equipped with two dual-core Opteron server processors (4 cores total) and 8 GB of memory. The Client Machine is equipped with one AMD dual-core processor and 1.5 GB of memory. The trustworthy controller station 160 is a 32-bit Athlon system with a 1 GHz single-core processor and 756 MB of memory. The server, client and trustworthy controller station 160 runs Linux Slackware 11. The client dispatcher runs Linux Fedora 6.

One may notice that a relatively moderate machine was used as the server (the Dell workstation), not the most powerful one in testbed (the Sun Fire server).

This is a deliberated arrangement to ensure that neither the client nor the Client Dispatcher 120 is the bottleneck in experiments. In all our experiments, the client and Client Dispatcher 120 very seldom used 60% of processing cycles when the server is pushed to 100%. All performance results are in this way determined by the server's hardware capacity and the trustworthy controller architecture overhead—the component for which measurements were attempted.

The software configuration of the prototype will now be discussed. The proof-of-concept experiments used the CylantSecure™ for Linux sensor, obtained under license from Reflex Technology, Inc. This sensor runs inside a virtual server and measures system calls made to the operating system by running processes. CylantSecure executes in two phases: a prior-to-deployment training phase where the sensor monitors a server's execution in a sterile or sandboxed environment, and an operational phase where online system behavior is contrasted with the known-good training-phase behavior. Under CylantSecure, the Linux kernel is instrumented to record which branches are taken at each of thousands of discriminating instrumentation points in the kernel such as certain conditional statements in system calls. The sensor stores these measurements in a kernel activity histogram. During operation, the sensor frequently calculates the distance between the training histogram and the operational histogram and reports this distance as a floating-point number (from 0 up to potentially infinity). The distance 0 means being perfectly in line with the training model. Values from 0.1 to 0.2 represent events worthy of attention. Value 1.0 indicates a serious anomaly. A time-series view of anomaly events for a particular virtual server was observed with summed anomaly distances within a fixed time interval (every 5 seconds). Spikes in the graph indicated highly anomalous events reported by CylantSecure.

A Cylant report includes, among other information, the path and ID of the process producing the report, the path and ID of the parent process, the ID of the user executing the process, and the Cylant distance. The Cylant distances are not deterministic given the same sequence of events. This is because distance computation itself is subject to scheduling by the underlying OS. Scheduled at different time points to compute could produce different outputs. VMware Workstation 5.5 was used as a host-based virtualization solution and Apache as the web-serving solution. Apache00 1510 in FIF 15 is the first virtual web server created, based on Slackware 11 and with Apache and CylantSecure installed. A narrow Cylant training was performed on Apache00 1510. The training is described as "narrow" for it includes only those functions and activities required for web services and the trustworthy controller architecture operations. These include: (1) Web service workload. During training, web requests were generated by both humans and automatic tools (httperf [19]). The requests include static html files, images, and PDF files, as well as the invocation of CGI scripts. (2) A limited set of actions at the virtual server handler's disposal in response to Cylant reports.

Conspicuously missing from the above training model are system configuration, administration, and upgrade activities. Those are considered offline tasks and outside the management of trustworthy controller software. With the Cylant training model built in, Apache00 1510 was cloned to create Apache01 1511, Apache02 1512, and Apache03 1513. The clones are reconfigured to use different IP and MAC addresses. The results are four identical virtual web servers, except for their network identities. For robustness, a more desirable configuration would be diverse copies, however, for the purposes of this test, the attempt was to measure the performance of the system after successful attack.

Narrow training was used with the trustworthy controller architecture. Continuing the example of inbound and outbound mail servers, the two servers were trained separately for their specific functions. In this hypothetic scenario, CylantSecure would easily see any outgoing trustworthy controllerP connections as anomaly for an inbound mail server.

Trustworthy controller software modules in the prototype were implemented in the Perl language. In particular, there are two Perl scripts. The tc.pl script implements the trustworthy controller 160 shown in FIG. 7. The vsh.pl script implements virtual server handlers (761 through 769). As seen in FIG. 7, for every active virtual server (141 through 149) there is a corresponding vsh.pl process that receives Cylant outputs from the virtual server, make decisions for local actions on the virtual server, and make periodic virtual server summary reports to trustworthy controller 710. In the present embodiment, the virtual server handler supports two local actions:

Apache heartbeats. Specifically, virtual serverH uses the "start" Apache command to periodically (re-)launch Apache services. The start command works as follows: if there is no Apache processes (httpd) running, then it launches the service; otherwise, it does nothing. Because the overhead of the start command is negligible when the Apache service is available, each virtual serverH simply issues to its virtual server heartbeats at the rate of one every 2 seconds. Had the Apache been crashed by either attacks or bugs, its service will be restored within 2 seconds.

Killing suspicious, non-critical processes. First a white list of programs was built that are related to the services provided by the virtual server (in the prototype, the Apache processes httpd) and the direct children of the init process (in Unix/Linux those are the processes that provide basic essential services for a system to function). The virtual serverH will kill any process that is not on the white list and reported by Cylant to be suspicious (distance≥0.15). If the parent process of the suspicious process is not of ID 1 (the init process), it is also killed. Lastly, the free, BSD-licensed Pure Load Balancer (plb.sunsite.dk) software was installed and configured in the Client Dispatcher 120 machine. PLB is known for its high capacity but presently supports only the HTTP protocol.

Test Cases

To test the effectiveness of the closed-loop control structure, three attack scenarios were created. All the attacks described below are manufactured in the sense that they do not exploit real Apache vulnerabilities to achieve the desired effects. Rather, a Perl CGI is created and intentionally programmed so that a certain "magic inputs" will cause it to launch certain attacks.

Denial of Service attacks by crashing Apache. In this implementation, this is triggered by the magic string "echo=xXx" passed to the Perl CGI, which in turn simply shutdown all Apache processes.

Active malicious processes. Many cyber attacks create new malicious processes or turn the victim itself into a malicious one. The process then actively attacks other servers or tries to penetrate deeper into the intranet. In this implementation, the magic CGI input "echo=yYy" was intentionally used to spawn a process which performs a flooding ping attack on a pre-programmed target (the trustworthy controller station 160 itself in the present code).

Sleeper processes. These processes characterize botnet "zombies" that stay asleep for periods of time, waking up to receive command and control instructions and/or engage in more active attacks in the future. When these processes remain inactive, they tend to evade detection mechanisms. However, if the sleeper wakes up, it risks being detected. In this prototype, the magic CGI input "echo=zZz" creates a process that runs an indefinite loop to sleep for one second, wake up, and sleep again.

For the three types of attacks, the system response was considered. For a denial-of-service attack, the service of the victim virtual server was restored by the next Apache start command, within 2 seconds. System-wide performance disturbances caused by such an attack is the subject of the next section.

For an active malicious process, consider a typical network-worm attack. The worm will be probing for other vulnerable servers. This involves initiating trustworthy controllerP connections to large numbers of IP addresses. A normal server on the other hand typically just listens on a well-defined port for clients' connection requests. In this way, the aberrant behavior may be reported by the anomaly detection sensors (e.g., as a result of multiple new threads or processes launched by the parent process). If the sensor reporting is sufficient, the corresponding virtual serverH will immediately kill the malicious process and these sensor reports will prompt trustworthy controller to revert earlier the virtual server back to its pristine state. Since the above procedure involves sensors' reactions to specific attacks, one cannot guarantee in general the success for all types of active malicious processes. In the worst case, these attacks will be eliminated in the next pre-scheduled revert of the victim virtual server.

For sleeping processes, if the zombie stays inactive for too long, it will be removed when the virtual server is reverted to its pristine snapshot. On the other hand, if it awakes as a new process and creates a lot of anomalous activity, then it is likely to be killed by local actions or eliminated when the machine reverts its state.

Discussion of CylantSecure

As with any intrusion detection system, CylantSecure is not always correct. In the experiments, many reported events were observed, usually with small distances. The precise chances for false negatives were hard to gauge. Through trial and error, some dangerous activities were found, such as tampering with kernel parameters through the /proc file system, evading its attention. Besides these exceptions, CylantSecure is in general very sensitive to small deviations from the training model. In fact, experiments often left the experimenters being logged out of a virtual server console with a simple command such as ls or ps. As an unintended bonus, remote login by ssh in the interactive mode will not succeed either because the bash shell spawned from the login will be killed immediately. The implication of this "bonus," however, cannot be underestimated: even if an enemy obtains the root passwords through guessing or social engineering, they still cannot login into the servers. In fact, the SANS Institute lists brute-force attacks against ssh through password guessing as one of the top UNIX vulnerabilities as of year 2006.

Drawing from the prototyping experiences, the trustworthy controller architecture was found to work well with sensitive intrusion detection systems, those that rather produce false alarms than miss an attack. False negatives (that is, undetected successful attacks) are handled through periodic reversions with accompanying overhead—a subject we investigate in the next section.

Performance Results

Figure 15:
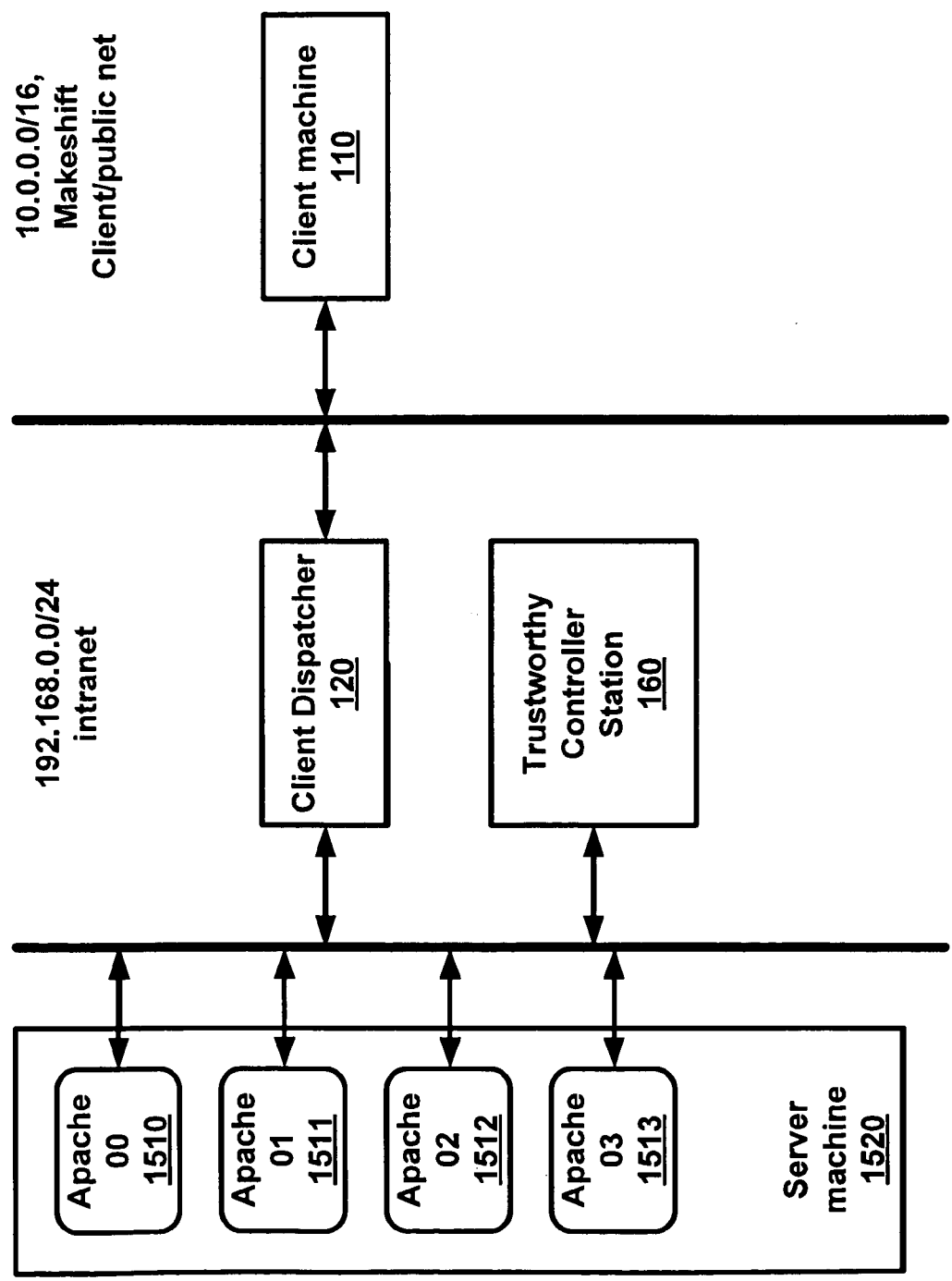
FIG. 15 is a block diagram of a hardware configuration for a prototype of an embodiment of the present invention used in a series of experiments.

In this section, performance results are presented for the prototype and compared them with a baseline server setup. The baseline setup in the testbed, to which the system performance was compared, uses the Server Machine in FIG. 15 (the Dell Workstation) as a stand-alone server, running Apache directly on the host OS Slackware 11. Web contents and Apache configurations were identical to those used in Apache virtual servers. The LB is still used, even though it has only one server address to distribute client requests to. This ensured comparable roundtrip times between the client and server, in both the baseline setup and the trustworthy controller architecture.

Two performance metrics were of interest: 1) throughput, specifically the number of HTTP requests a system can handle per second sustainably, and 2) recovery window after service is rendered unavailable due to attacks or bugs. Httperf [19] was used to measure throughput. In all experiments below, we httperf parameters were set as follows. The number of calls/requests per trustworthy controllerP connections were 20. This reflects the common situation where the clients use HTTP 1.1 (which allows more than one call/request per connection) to fetch the contents of a sophisticate web page that includes many objects. The number of requests per second and the total number of requests were set in a way that it takes 5 seconds to send all the requests. It must be emphasized that the time for httperf to complete such a measurement often takes more than 5 seconds, due to reply delays or sometimes request retransmissions.

The Baseline System

Figure 16:
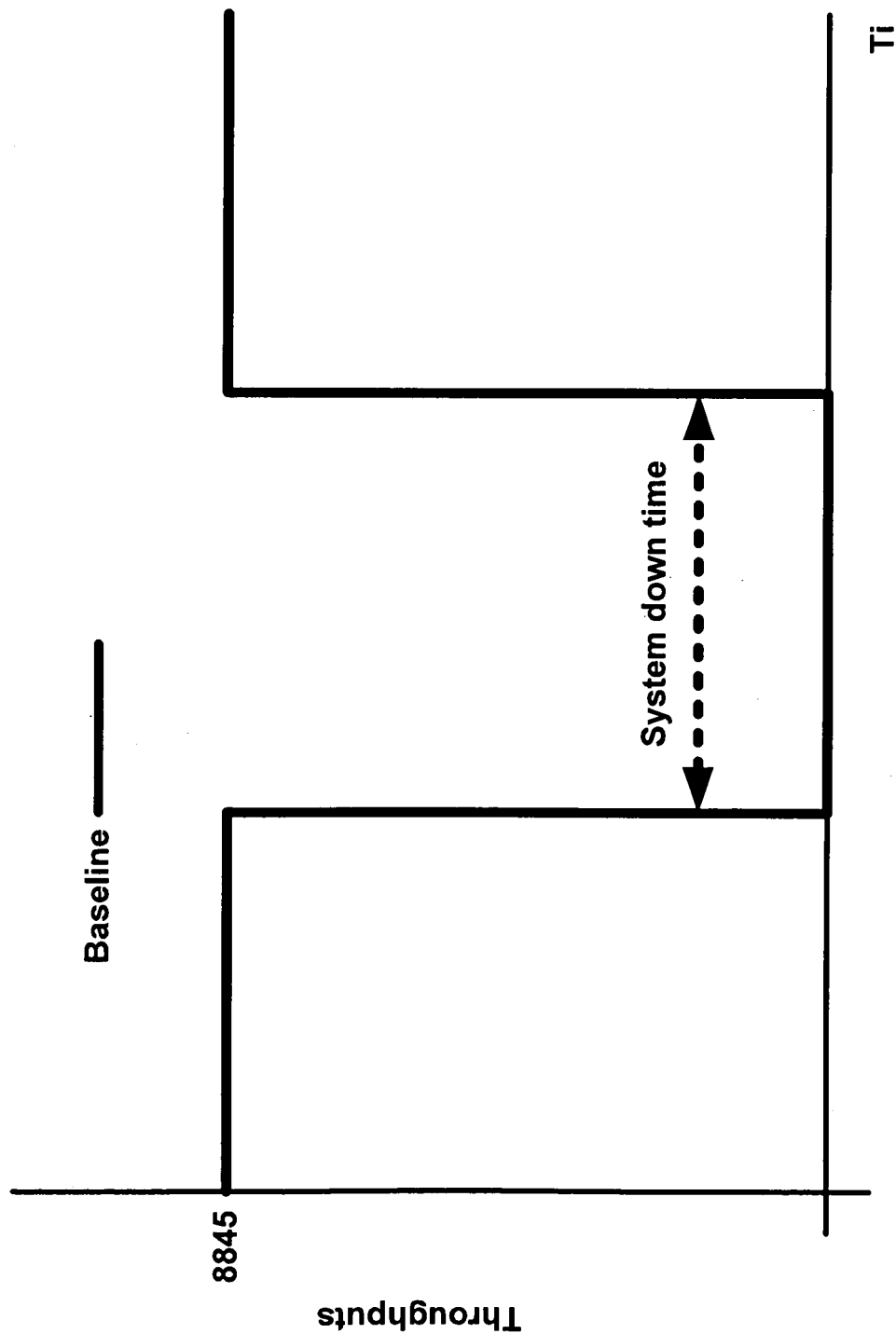
FIG. 16 is a graph showing a baseline throughputs and recovery behavior using the prototype described in FIG. 15.

The results from baseline testing are shown in FIG. 16. Without the overhead of virtualization, virtual server reverts, intrusion detection sensors, and trustworthy controller-imposed communications and actions, the baseline system was able to sustain slightly less than 9000 (precisely 8854). After an Apache crash, the recovery window of the baseline system was, however, hard to measure experimentally. In reality, this down time is determined by: 1) the time an administrator is first alerted by service unavailability either by client complaints or system monitor tools, 2) the think time to determine the course of action, 3) the time for the actions to take effect. The actions that administrators adopt also vary. One administrator may simply re-launch Apache using the start command. Another may decide to reboot the server to remove hidden malicious processes in memory (e.g., back doors or network worms). As was pointed out earlier, a reboot does not remove file system corruptions. A prudent administrator will perform a thorough system audit and cleanup or even a complete reinstallation to be certain of the system integrity. The process will be time consuming. In FIG. 16, an undetermined length of down-time was shown to represent the above uncertainties. After recovery, the baseline system resumes its normal operations and sustainable throughput.

Trustworthy Controller Throughput without Reverts

The throughput of the trustworthy controller architecture was measured first during quiet periods, when there were no attacks and virtual server reverts. However, the experiment still included the usual trustworthy controller overheads: virtualization, Cylant anomaly detection, and the communications required by the trustworthy controller architecture and the actuators triggered by false alarms. The results of 100 httperf measurements show that the normal throughput of trustworthy controller is 5958±7 HTTP request/replies per second, at 90% confidence. Under non-attack conditions, this represents a 33% performance loss compared to the baseline system, owing to the basic operational overhead of the trustworthy controller architecture.

One may have noticed that a workstation virtualization product was choosen for a server project. It is commonly believed that a host-less technology, such as the VMware ESX Server, minimizes the overhead of the host operating systems and offers significantly improved performance especially for I/O intensive applications, such as the throughput tests. The ESX server however is demanding on hardware. At the time of building the prototype, there was not a machine available capable of running ESX and Xen does not provide the functions of snapshots and reversions. While there are good reasons to believe a host-less virtualization, such as Xen or VMware ESX, will significantly reduce the overhead of the trustworthy controller architecture, it remains a conjecture at this time.

The Revert Overheads

Figure 17:
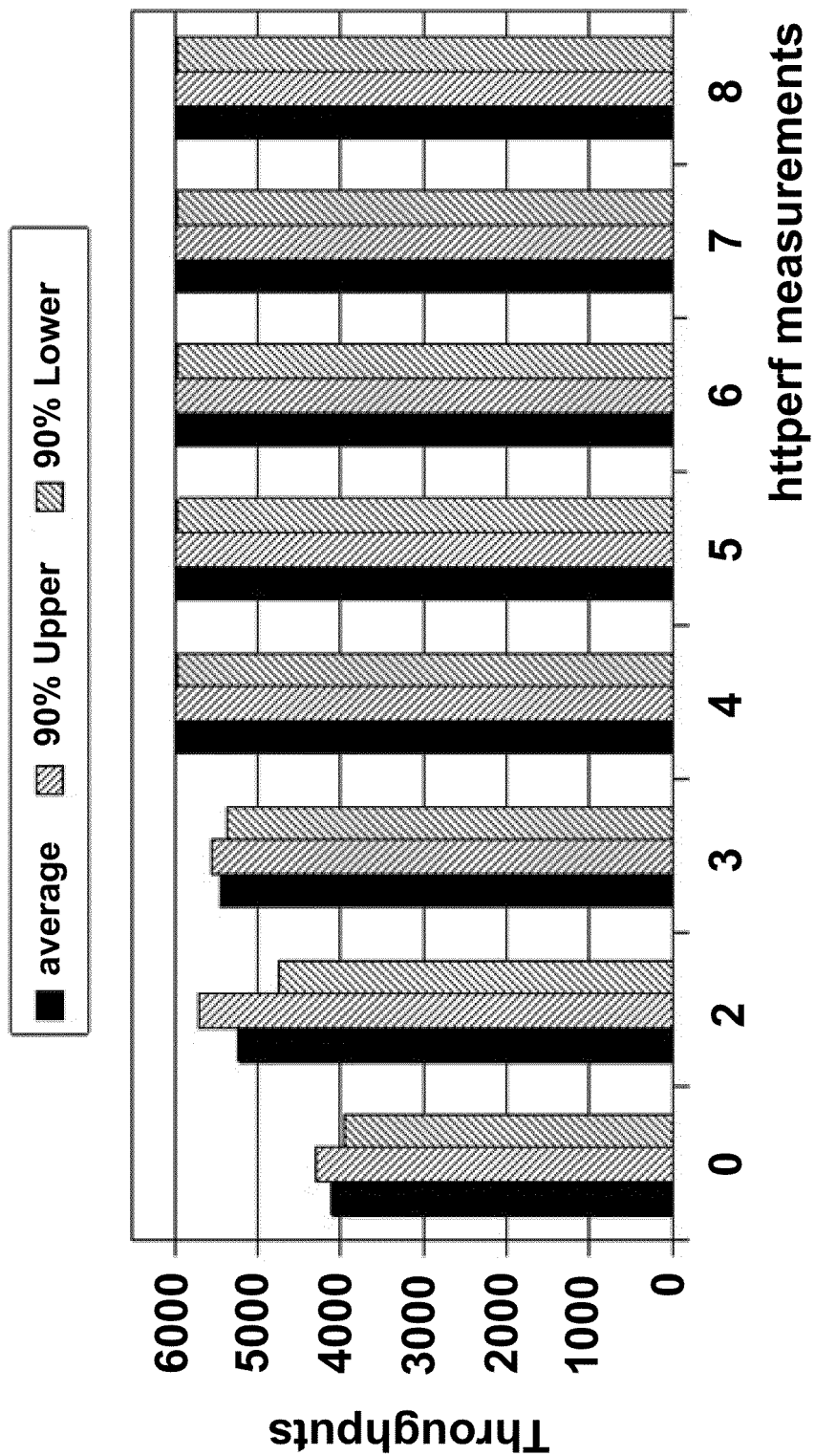
FIG. 17 is a graph showing virtual server revert overhead using the prototype described in FIG. 15.

Virtual server revert is the mechanism in the trustworthy controller architecture that guarantees virtual servers will periodically return to a pristine state, removing all corruptions when they were exposed online. To investigate the price of such a powerful measure, eight httperf measurements were issued starting at the beginning of a virtual server revert. The experiments were repeated 30 times and their results are shown in FIG. 17. As seen, when a reversion starts, the throughput drops to 4000+ and returns to the normal throughputs of 6000− in the forth measurement. The total times of each experiment were averaged at 60.1 seconds, (that is, 8 samples per minute). One can thus interpret the entire X-axis intervals in FIG. 17 as one minute. It was concluded that a virtual server revert causes a less than 30-second period of performance degradation. The worst degradation occurs at the beginning of a virtual server revert but is still within 30% range of the peak performance. Amortizing the revert overhead throughout the entire one minute period, the average throughput was still 5570, within 93% of the normal trustworthy controller throughput.

The penalty of a virtual server revert is a function of its overhead. Based on the observations, reverting a VMware virtual machine to a snapshot starts with a short but intense period of CPU activities, accounting for the lowest performance at the beginning of reversion. Afterward, the reversion process reloads the snapshot memory image and is much less CPU intensive. Because each VMware virtual machine/server is seen by the host as a process, lowering the priority of a virtual server reversion process should reduce its disturbance to servicing clients and consequently minimize the associated performance penalty.

Figure 18:
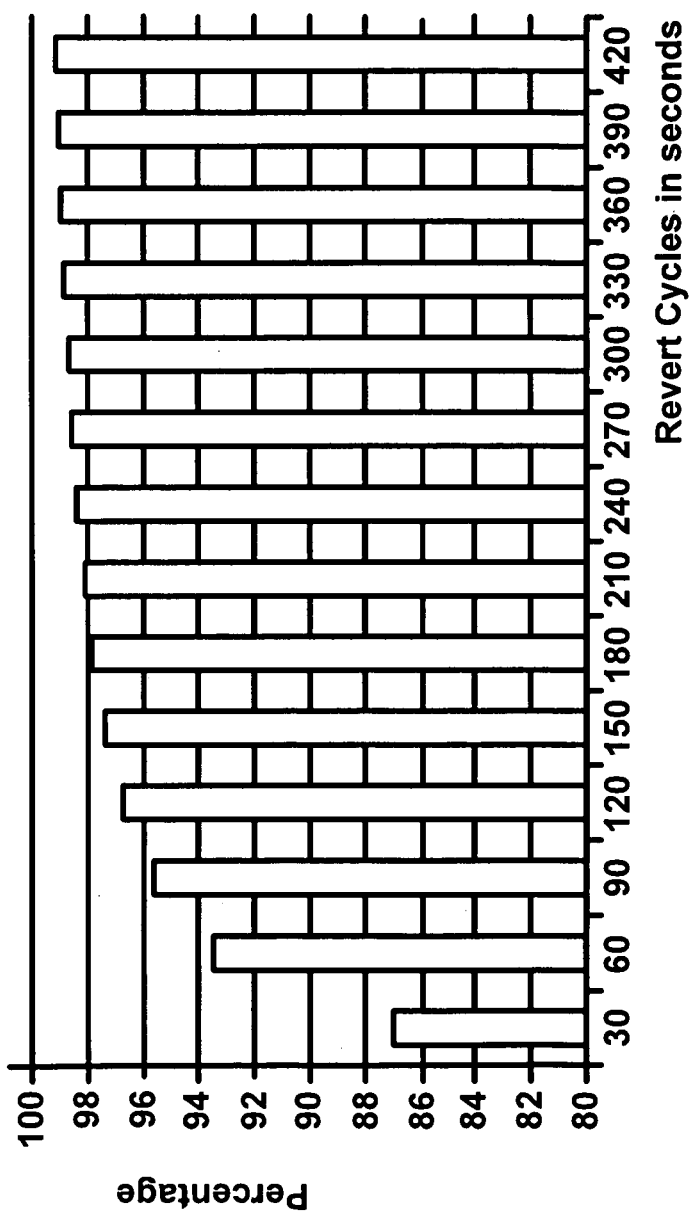
FIG. 18 is a graph showing amortized throughputs per revert cycle as percentage to the normal throughputs using the prototype described in FIG. 15.

FIG. 18 shows the impact of increasing revert cycle intervals (of amortized throughput) as a percentage of the normal throughput 5958. At a revert cycle interval of 2 minutes (120 s), the amortized throughput exceeds 96% of the normal throughput. If the revert cycle interval is increased to 7 minutes, the amortized throughput exceeds 99% of the normal throughputs. In other words, the results show it is possible to set a fixed revert cycle as short as 7 minutes (420 s) with minimal degradation in throughput. It is emphasized again that the results in FIG. 18 are amortized. Revert overhead concentrates on the beginning of each revert cycle; it is not evenly distributed throughout the cycle.

In the prototype, four virtual servers were used with 30 minutes of lifespan each. If there is no attacks to corrupt the virtual servers, there will be a revert every 7.5 minutes, losing less than 1% of the normal throughputs. Inversely, if one is willing to take a 5% loss in the amortized performance, a virtual server revert can be triggered every 90 seconds. In our prototype, this translates to the lifespan of 6 minutes for each of the four virtual servers. The effect is that any undetected corruption on any virtual server will be removed within 6 minutes. The trustworthy controller architecture in this way presents an attractive tradeoff between performance and tolerance for undetected intrusions, a hard question for any security systems.

Trustworthy Controller Recovery from Apache Crashes

As described earlier the virtual serverH for every virtual server sends an Apache start command every two seconds. As a result, the service recovery window of a victim virtual server ranges from 0 to 2 seconds. However, httperf imposes a minimum period of 5 seconds to calculate meaningful average throughputs. Therefore, it was not possible to probe into the recovery periods. In this experiment, one DoS attack was issued in every httperf measurement. Notice that one DoS attack renders the service of one virtual server unavailable, not all virtual servers. To avoid skewed results due to synchronization, the exact time points of attacks are randomized from the beginning of the measurement to 2 seconds into the measurement. The results show that the trustworthy controller architecture was able to handle 5250 requests per seconds under such attacks. The variations of this experiment are much higher. The 90% confidence interval is ±130. an outlier was also reported in the results: 2209 in one measurement. In general, the trustworthy controller architecture was able to retain ≈88% of its throughput when it is under consecutive DoS attacks (one every 5 to 6 seconds). On rare occasions, the drops in throughputs may be more severe.

Conclusion

The Trustworthy Controller architecture, which employs virtualization and closed-loop feedback control for server cluster security was disclosed. By virtualizing servers and periodically reverting virtual servers to pristine state, the trustworthy controller architecture automatically contains undetected corruptions to limited time windows. Upon this integrity foundation, light-weight actuators can be deployed to fend off intrusions, real or wrongly perceived. In this way, the trustworthy controller architecture works well with high-noise intrusion and anomaly sensors, typical of many intrusion detection technologies. Performance results on a first generation prototype indicate 30% of architectural overheads. Rather than total service disruption, the prototype loses merely 12% of its performance under denial of service attacks (Apache crashes) within 5-second windows of the attacks. Performance returns to its normal level afterwards. The trustworthy controller architecture presents an attractive option to those who face the dilemma of handling an estimated peak workload while guaranteeing non-stop service.

The following references are referred to as an aid to explain and enable the present embodiments: [1] Wagner, D., J. Foster, E. Brewer, and A. Aiken, "A First Step towards Automated Detection of Buffer Overrun Vulnerabilities," in *Proceedings of NDSS* 2000; [2] Ashcraft and D. Engler, "Using programmer-written compiler extensions to catch security holes," in *Proceedings of IEEE Security and Privacy*, 2002; [3] Ball, T., and S. K. Rajamani, "The SLAM project: Debugging system software via static analysis," in *POPL* 2002;. [4] Wang, H., C. Guo, D. Simon, and A. Zugenmaier, "Shield: Vulnerability-driven network filters for preventing known vulnerability exploits," in *Proceedings of ACM SIGCOMM*, August, 2004, Portland, Oreg.; [5] Rinard, M., C. Cadar, D. Dumitran, D. Roy, T. Leu, and J. W. Beebee, "Enhancing server availability and security through failure-oblivious computing," in *Proceedings of the 6th Symposium on Operating Systems Design and Implementation (OSDI)*, December 2004; [6] Sidiroglou, M. E. Locasto, S. W. Boyd and A. Keromytis, "Building a Reactive Immune System for Software Services," in *Proceedings of the USENIX Technical Conference*, 2000; [7] Qin, F., J. Tucek, J. Sundaresan, and Y. Zhou, "Rx: treating bugs as allergies—a safe method to survive software failures," in *Proceedings of the 20th ACM Symposium on Operating Systems Principles (SOSP)*, pp. 235-248, 2005; [8] Sidiroglou, S., O. Laadan, A. Keromytis, "Using Rescue points to Navigate Software Recovery (Short Paper)," in *Proceedings of the IEEE Symposium on Security & Privacy*, pp. 273-278, May 2007, Oakland, Calif.; [9] Yong, S. H. and S. Horwitz, "Protecting C Programs via Invalid Pointer Dereferences," in *Proceedings of the 9th European Software Engineering Conference*, 2003; [10] Vaidyanathan, K., R. E. Harper, S. W. Hunter, K. S. Trivedi, "Analysis and implementation of software rejuvenation in cluster systems," *Proceedings of the 2001 Conference on Measurement and Modeling of Computer Systems* (SIGMETRICS '01), Vol 29, Issue 1; [11] VM history and heritage. http://www.vm.ibm.com/history/; [12] R. J. Creasy. The origin of the VM/370 time-sharing system. IBM J. Research and Development, 25(5):483-490, September 1981; [13] VMware, http://www.vmware.com; [14] Paul Barham, Boris Dragovic, Keir Fraser, Steven Hand, Tim Harris, Alex Ho, Rolf Neugebauer, Ian Pratt, Andrew Warfield, "Xen and the Art of Virtualization," *Proceedings of the nineteenth ACM symposium on Operating systems principles*, Oct. 19-22, 2003, Bolton Landing, N.Y., USA; [15] Jeff Dike, "A User-Mode Port of the Linux Kernel," *Proceedings of the 2000 Linux Showcase and Conference*, October 2000; [16] The User-mode Linux Kernel Home Page: http://user-mode-linux.sourceforge.net/index.html; [17] KVM (Kernel-based Virtual Machine). http://kvm.qumranet.com/kvmwiki/FrontPage; [18] Microsoft Virtual Server 2005, http://www.microsoft.com/windowsserversystem/virtualserver/; [19] D. Mosberger and T. Jin. httperf: A Tool for Measuring Web Server Performance. Performance Evaluation Review, Volume 26, Number 3, December 1998, 31-37.

Many of the elements described in the disclosed embodiments may be implemented as modules. A module is defined here as an isolatable element that performs a defined function and has a defined interface to other elements. The modules described in this disclosure may be implemented in hardware, software, firmware, wetware (i.e hardware with a biological element) or a combination thereof, all of which are behaviorally equivalent. For example, modules may be implemented as a software routine written in a computer language (such as C, C++, Fortran, Java, Basic, Matlab or the like) or a modeling/simulation program such as Simulink, Stateflow, GNU Octave, or LabVIEW MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The foregoing descriptions of the embodiments of the claimed invention have been presented for purposes of illustration and description. They are not intended to be exhaustive or be limiting to the precise forms disclosed, and obviously many modifications and variations are possible in light of the above teaching. The illustrated embodiments were chosen and described in order to best explain the principles of the claimed invention and its practical application to thereby enable others skilled in the art to best utilize it in various embodiments and with various modifications as are suited to the particular use contemplated without departing from the spirit and scope of the claimed invention. In fact, after reading the above description, it will be apparent to one skilled in the relevant art(s) how to implement the claimed invention in alternative embodiments. Thus, the claimed invention should not be limited by any of the above described example embodiments.

In addition, it should be understood that any figures, graphs, tables, examples, etc., which highlight the functionality and advantages of the claimed invention, are presented for example purposes only. The architecture of the disclosed is sufficiently flexible and configurable, such that it may be utilized in ways other than that shown. For example, the steps listed in any flowchart may be reordered or only optionally used in some embodiments.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the claimed invention of the application. The Abstract is not intended to be limiting as to the scope of the claimed invention in any way.

Furthermore, it is the applicants' intent that only claims that include the express language "means for" or "step for" be interpreted under 35 U.S.C. § 112, paragraph 6. Claims that do not expressly include the phrase "means for" or "step for" are not to be interpreted under 35 U.S.C. § 112, paragraph 6.

A portion of the claimed invention of this patent document contains material which is subject to copyright protection. The copyright owner has no objection to the facsimile reproduction by anyone of the patent document or the patent invention, as it appears in the Patent and Trademark Office patent file or records, but otherwise reserves all copyright rights whatsoever.

What is claimed is:

1. A trustworthiness controller comprising:
    a. a sensor module configured to collect behavior data for at least one online server;
    b. at least one state estimation module configured to generate at least one state estimate for at least one of the at least one online server using the behavior data;
    c. at least one response selection module configured to determine at least one selected response to maintain an availability and an integrity of at least one of the at least one online server when at least one of the at least one state estimate indicates that the integrity of at least one of the at least one online server is compromised;
    d. at least one actuation module configured to activate at least one actuator based upon at least one of the at least one selected response; and
    e. a client dispatcher communication module configured to communicate online server availability information to a client dispatcher;
    f. wherein:
        i. at least one of said at least one online server is a virtual online server; and
        ii. said trustworthiness controller employs one or more processors.

2. The trustworthiness controller according to claim 1, wherein said sensor module includes at least one of the following:
    a. an intrusion sensing module configured to detect an external intrusion in at least one of the at least one online server;
    b. an integrity monitoring module configured to detect an unauthorized change to at least one of the at least one online server;
    c. an anomaly detection module configured to detect behavior by at least one of the at least one online server that is indicative of an intrusion;
    d. a performance monitoring module configured to detect an unpredicted decrease in performance of at least one of the at least one online server;
    e. an exposure timer module configured to limit a window of vulnerability to at least one of the at least one online server;

f. a sensor observation module configured to collect observation data from at least one of the at least one online server; or g. any combination thereof.

3. The trustworthiness controller according to claim 1, wherein the state estimation module uses at least one of the following:

a. a rule-based estimation module configured to influence at least one of the at least one state estimate using a rule that evaluates behavior data of at least one of the at least one online server;

b. a stochastic control module configured to influence at least one of the at least one state estimate using current behavior data and historical behavior data of at least one of the at least one online server;

c. a Bayes Net module configured to influence at least one of the at least one state estimate using current behavior data conditioned on prior behavior data of at least one of the at least one online server; or d. any combination thereof.

4. The trustworthiness controller according to claim 1, wherein the actuator module facilitates at least one of the following:

a. a server restart module configured to terminate and restart a server;

b. a server reversion module configured to revert a virtual machine to a predetermined state;

c. a client request throttling module configured to throttle client requests;

d. a blocking module configured to block client requests; or e. any combination thereof.

5. The trustworthiness controller according to claim 1, wherein said at least two of the at least one online server are on different physical servers.

6. The trustworthiness controller according to claim 1, further including:

a. an incoming communications module configured to receive instructions from a higher level controller, the higher level controller configured to manage a multitude of trustworthiness controllers; and b. an outgoing communication module configured to communicate summary reports to the higher level controller.

7. A trustworthy network server system comprising:

a. at least one hardware server configured to host at least one virtual machine;

b. at least one virtual server residing on at least one of the at least one virtual machine;

c. a client dispatch module configured to:
 i. maintain a list of available virtual servers, at least one of the available virtual servers being one of the at least one virtual server; and
 ii. route at least one client request to at least one of the available servers listed on the list of available virtual servers;

d. at least one virtual machine monitor configured to manage at least one of the at least one virtual machine; and e. at least one trustworthiness controller module including:
 i. a sensor module configured to collect behavior data for at least one of the at least one online server;
 ii. at least one state estimation module configured to generate at least one state estimate for at least one of the at least one online server using the behavior data;
 iii. at least one response selection module configured to determine at least one selected response to maintain an availability and an integrity of at least one of the at least one online server when at least one of the at least one state estimate indicates that the integrity of at least one of the at least one online server is compromised;
 iv. at least one actuation module configured to activate at least one actuator based upon at least one of the at least one selected response; and
 v. a client dispatcher communication module configured to communicate online server availability information to a client dispatcher.

8. The trustworthy network server system according to claim 7, wherein the client dispatcher is a load balancer.

9. The trustworthy network server system according to claim 7, wherein at least one of the at least one virtual machine manager is configured to:

a. create a pool of the at least one virtual machine; and b. execute at least one instruction from at least one of the at least one trustworthiness controller module.

10. The system according to claim 7, wherein at least one of the at least one sensor module includes at least one of the following:

a. an intrusion sensing module configured to detect an external intrusion in at least one of the at least one online server;

b. an integrity monitoring module configured to detect an unauthorized change to at least one of the at least one online server;

c. an anomaly detection module configured to detect behavior by at least one of the at least one online server that is indicative of an intrusion;

d. a performance monitoring module configured to detect an unpredicted decrease in performance of at least one of the at least one online server;

e. an exposure timer module configured to limit a window of vulnerability to at least one of the at least one online server;

f. a sensor observation module configured to collect observation data from at least one of the at least one online server; or g. any combination thereof.

11. The system according to claim 7, wherein at least one of the at least one state estimation module includes at least one of the following:

a. a rule-based estimation module configured to influence at least one of the at least one state estimate using a rule that evaluates behavior data of at least one of the at least one online server;

b. a stochastic control module configured to influence at least one of the at least one state estimate using current behavior data and historical behavior data of at least one of the at least one online server;

c. a Bayes Net module configured to influence at least one of the at least one state estimate using current behavior data conditioned on prior behavior data of at least one of the at least one online server; or d. any combination thereof.

12. The system according to claim 7, wherein at least one of the at least one actuator includes at least one of the following:

a. a server restart module configured to terminate and restart a server;

b. a server reversion module configured to revert a virtual machine to a predetermined state;

c. a client request throttling module configured to throttle client requests;

d. a blocking module configured to block client requests; or e. any combination thereof.

13. The system according to claim 7, wherein at least one of the at least one virtual server is a single-purpose application server.

14. A non-transitory computer-readable media tangibly embodying a program of instructions executable by a computer to perform a method for maintaining an availability and an integrity of at least one virtual server, the method comprising:
- a. generating a state estimate for at least one of the at least one virtual server using behavior data obtained using at least one sensor module;
- b. determining at least one selected response to maintain the availability and the integrity of at least one of the at least one virtual server when the state estimate indicates that the integrity of at least one of the at least virtual server is compromised;
- c. activating at least one actuator based upon at least one of the at least one selected response; and
- d. communicating virtual server availability information to a client dispatcher module, the client dispatcher module configured to route client requests to at least one selected at least one virtual server.

15. The non-transitory computer-readable media according to claim 14, wherein the client dispatcher module is further configured to maintain a list of available at least one virtual server.

16. The non-transitory computer-readable media according to claim 14, wherein at least one of the at least one sensor module is configured to perform at least one of the following actions:
- a. detecting an external intrusion in at least one of the at least one virtual server;
- b. detecting an unauthorized change to at least one of the at least one online server;
- c. detecting behavior by at least one of the at least one online server that is indicative of an intrusion;
- d. detecting an unpredicted decrease in at least one of the at least one online server;
- e. limiting a window of vulnerability to at least one of the at least one online server; or
- f. a combination of the above.

17. The non-transitory computer-readable media according to claim 14, wherein the state estimate is generated using at least one of the following:
- a. a rule-based estimation module configured to influence at least one of the at least one state estimate using a rule that evaluates behavior data of at least one of the at least one online server;
- b. a stochastic control module configured to influence at least one of the at least one state estimate using current behavior data and historical behavior data of at least one of the at least one online server;
- c. a Bayes Net module configured to influence at least one of the at least one state estimate using current behavior data conditioned on prior behavior data of at least one of the at least one online server; or
- d. any combination thereof.

18. The non-transitory computer-readable media according to claim 14, wherein at least one of the at least one actuator is configured to perform at least one of the following actions:
- a. terminate and restart a server;
- b. revert a virtual machine to a predetermined state;
- c. throttle client requests;
- d. block client requests; or
- e. any combination thereof.

19. The non-transitory computer-readable media according to claim 14, further including:
- a. receiving instructions from a higher level controller, the higher level controller configured to manage a multitude of trustworthiness controllers; and
- b. communicating summary reports to the higher level controller.

* * * * *